(12) United States Patent
Kim et al.

(10) Patent No.: US 11,983,643 B2
(45) Date of Patent: May 14, 2024

(54) COOKING RESULT INFERENCE SYSTEM

(71) Applicant: Haier US Appliance Solutions, Inc., Wilmington, DE (US)

(72) Inventors: Jungin Kim, Seoul (KR); Hoyoung Lee, Seoul (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 556 days.

(21) Appl. No.: 17/095,654

(22) Filed: Nov. 11, 2020

(65) Prior Publication Data

US 2022/0142400 A1 May 12, 2022

(51) Int. Cl.
| | |
|---|---|
| *G06N 5/04* | (2023.01) |
| *A47J 36/32* | (2006.01) |
| *F24C 3/12* | (2006.01) |
| *F24C 7/08* | (2006.01) |
| *G06T 7/00* | (2017.01) |
| *G06N 20/00* | (2019.01) |

(52) U.S. Cl.
CPC ............. *G06N 5/04* (2013.01); *F24C 3/128* (2013.01); *F24C 7/085* (2013.01); *G06T 7/0004* (2013.01); *A47J 36/321* (2018.08); *G06N 20/00* (2019.01); *G06T 2207/20081* (2013.01); *G06T 2207/20084* (2013.01); *G06T 2207/30128* (2013.01)

(58) Field of Classification Search
CPC ............ G06N 5/04; G06N 20/00; G06N 3/04; G06N 3/08; F24C 3/128; F24C 7/085; F24C 7/083; G06T 7/0004; G06T 2207/20081; G06T 2207/20084; G06T 2207/30128; A47J 36/321
See application file for complete search history.

(56) References Cited

U.S. PATENT DOCUMENTS

| | | | |
|---|---|---|---|
| 10,798,947 B2 * | 10/2020 | Dingman | G06F 3/0481 |
| 11,112,121 B2 * | 9/2021 | Park | G06V 20/52 |
| 11,687,776 B2 * | 6/2023 | Jeong | G06F 16/951 |
| | | | 706/15 |

(Continued)

FOREIGN PATENT DOCUMENTS

| | | | | |
|---|---|---|---|---|
| DE | 102013206758 A1 * | 10/2014 | | F24C 7/083 |
| EP | 3742052 A1 * | 11/2020 | | A47J 36/32 |

(Continued)

*Primary Examiner* — Mia M Thomas
(74) *Attorney, Agent, or Firm* — Dority & Manning, P.A.

(57) ABSTRACT

Systems, appliances, and methods for operating a cooking result inference system are provided herein. The cooking engagement system can include a controller in operable communication with a camera assembly, a mass sensor assembly, and a thermal sensor assembly. An image signal including an image of an object can be accessed. A mass signal including a mass of the object can be accessed from the mass sensor assembly. A temperature signal including a temperature of the object can be accessed from the thermal sensor assembly. An inferred cooking result can then be generated based on a machine-learned model that can perform operations on input including the image signal, the mass signal, and the temperature signal. The inferred cooking result can include an inferred image depicting the object as it is predicted to appear after a recommended cooking time at a recommended temperature.

20 Claims, 11 Drawing Sheets

(56) References Cited

U.S. PATENT DOCUMENTS

| | | | |
|---|---|---|---|
| 2015/0300652 A1* | 10/2015 | Guan | G06T 7/74 |
| | | | 382/103 |
| 2017/0238749 A1* | 8/2017 | Vengroff | A47J 36/321 |
| 2017/0238751 A1* | 8/2017 | Vengroff | H05B 1/0266 |
| 2019/0053332 A1 | 2/2019 | Adams et al. | |
| 2019/0200797 A1* | 7/2019 | Diao | G05B 19/42 |
| 2019/0261459 A1* | 8/2019 | Cha | H05B 6/6435 |
| 2020/0367692 A1* | 11/2020 | Stipe | G06V 20/52 |
| 2021/0057194 A1* | 2/2021 | Kon | H01L 21/6833 |
| 2022/0151436 A1* | 5/2022 | Newquist | A47J 37/1209 |

FOREIGN PATENT DOCUMENTS

| | | | | |
|---|---|---|---|---|
| JP | 2019153223 A | 9/2019 | | |
| KR | 20190096851 A | 8/2019 | | |
| KR | 20190105531 A | 9/2019 | | |
| WO | WO-2022178154 A1 * | 8/2022 | | F24C 7/081 |

\* cited by examiner

COOKING RESULT INFERENCE SYSTEM

FIELD OF THE INVENTION

The present subject matter relates generally to systems for aiding cooking operations, and more particularly to systems for enhancing cooking engagement and convenience with a cooktop appliance.

BACKGROUND OF THE INVENTION

Cooktop or range appliances can include heating elements that are used to heat food before it is consumed. These cooktop or range appliances can be configured to allow a user to adjust settings that allow the user to cook food at various temperatures for various periods of time. In this way a user can cook food according to their individual tastes and preferences. For example, the user can lower the cooking temperature and cook food for a longer duration to achieve more tender comestibles. Alternatively, the user can cook using a very high temperature for a short period of time to sear food items and achieve a charred appearance for those food items.

To avoid overcooking or undercooking foodstuffs, it may be useful to provide a user with preset cooking options that can cook certain foods for a preset time at a preset duration. For example, a cooking appliance can include various previously determined preset cooking options that can cook vegetables or meat with the touch of a button. Further, the preset cooking options can use information about the type of food to determine the cooking time and cooking temperature with minimal involvement from the user.

However, existing systems and the preset options that are available may provide an unsatisfactory user experience and can result in cooking outcomes that do not necessarily meet a user's expectations. For example, a preset cooking time and temperature may result in food that will be overcooked or undercooked without constant monitoring by the user. Requiring the user to monitor the food as it is being cooked creates an inconvenience that can obviate the intended purpose of the cooking presets. Further, the cooking presets may provide an outcome that is suitable for one user but unsuitable for another user. Additionally, the settings that a user enters may lead to unacceptable cooking outcomes as a result of user error (e.g., mistakenly entering an incorrect cooking time or cooking temperature) or uncertainty on the part of the user with respect to the appropriate cooking settings that should be used to properly cook a particular food item.

As a result, improved systems are needed in order to facilitate user engagement and interaction during use of a cooktop appliance. In particular, it may be advantageous to provide a system that can allow a user to more reliably determine the outcome of their cooking choices before the food has been cooked. In some cases, it may be advantageous to further provide a user engagement system to control or direct certain functions of the cooktop appliance.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a cooktop appliance is provided. The cooktop appliance can include a camera assembly directed at a cooktop surface; a mass sensor assembly configured to measure a mass of at least one object on the cooktop surface; a thermal sensor assembly configured to measure a temperature of the at least one object; and a controller in operable communication with the camera assembly, the mass sensor assembly, and the thermal sensor assembly. The controller is configured to initiate one or more result inference operations. The one or more result inference operations can include accessing an image signal from the camera assembly. The image signal can include an image of the at least one object. The one or more result inference operations can include accessing a mass signal from the mass sensor assembly. The mass signal can include the mass of the at least one object. The one or more result inference operations can include accessing a temperature signal from the thermal sensor assembly. The temperature signal can include the temperature of the at least one object. The one or more result inference operations can include generating an inferred cooking result based at least in part on a machine-learned model that is configured to perform operations on an input comprising the image signal, the mass signal, and the temperature signal. Furthermore, the inferred cooking result can include an inferred image of the at least one object as it is predicted to appear after a recommended cooking time at a recommended temperature.

In another exemplary aspect of the present disclosure, a method of inferring cooking results is provided. The method can include accessing, by a computing system that includes one or more processors, an image signal. The image signal can include an image of at least one object on a cooktop surface. The method can include accessing, by the computing system, a mass signal. The mass signal can include a mass of the at least one object. The method can include accessing, by the computing system, a temperature signal. The temperature signal can include a temperature of the at least one object. The method can include generating, by the computing system, an inferred cooking result based at least in part on a machine-learned model that is configured to perform operations on an input including the image signal, the mass signal, and the temperature signal. Furthermore, the inferred cooking result can include an inferred image of the at least one object as it is predicted to appear after a recommended cooking time at a recommended temperature In another exemplary aspect of the present disclosure, a system for inferring cooking results is provided. The system can include: one or more processors; and one or more memory devices. The one or more memory devices can store computer-readable instructions that, when executed by the one or more processors, cause the one or more processors to perform operations. The operations can include accessing an image signal from the camera assembly. The image signal can include an image of the at least one object. The operations can include accessing a mass signal from the mass sensor assembly. The mass signal can include the mass of the at least one object. The operations can include accessing a temperature signal from the thermal sensor assembly. The temperature signal can include the temperature of the at least one object. The operations can include generating an inferred cooking result based at least in part on a machine-learned model that is configured to perform operations on an input comprising the image signal, the mass signal, and the temperature signal. Furthermore, the inferred cooking result can include an inferred image of the at least one object as it is predicted to appear after a recommended cooking time at a recommended temperature.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
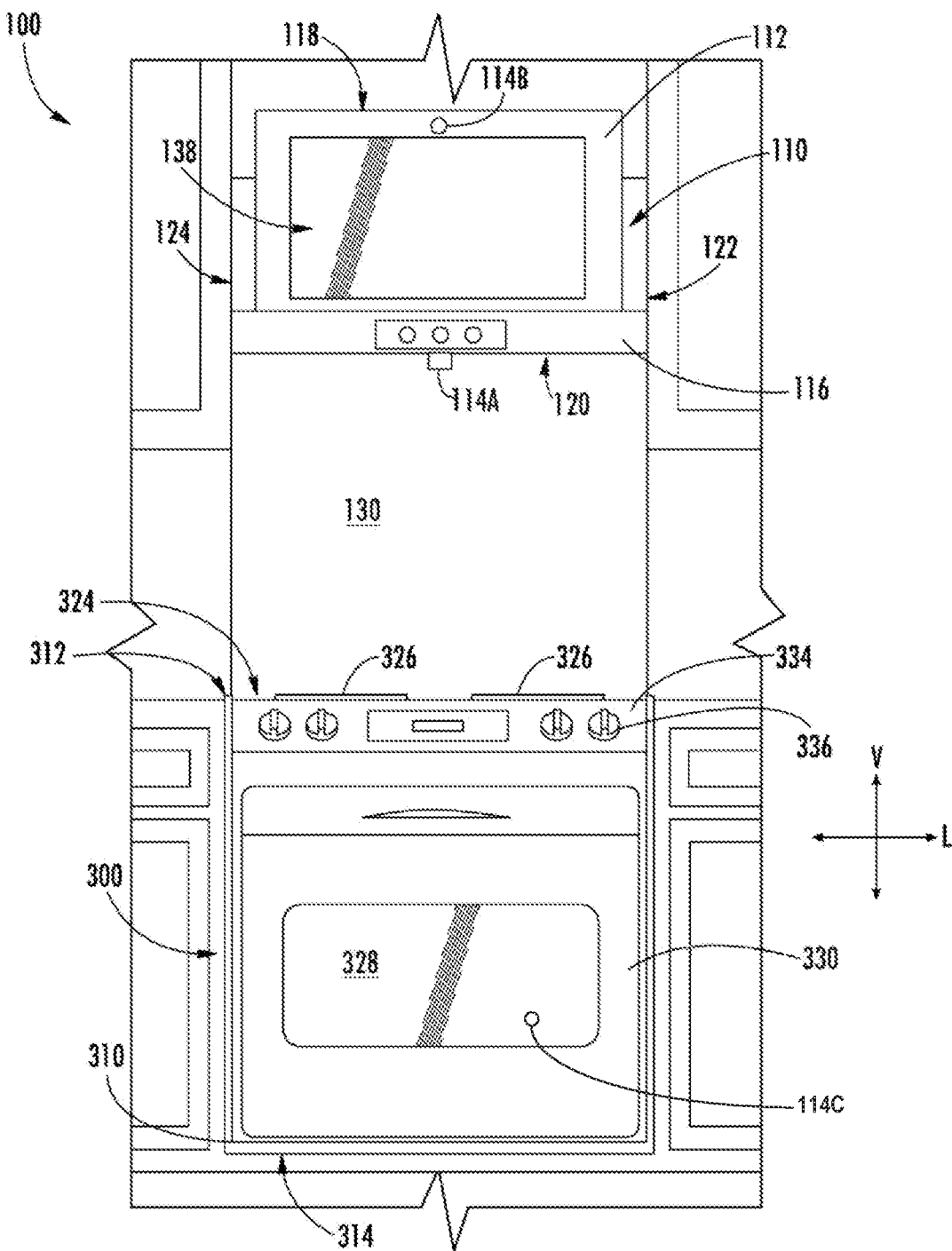
FIG. 1 provides a front perspective view of a system according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In order to aid understanding of this disclosure, several terms are defined below. The defined terms are understood to have meanings commonly recognized by persons of ordinary skill in the arts relevant to the present disclosure. The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Example aspects of the present disclosure are directed to a system (e.g., a cooking result inference system) that can generate an inferred cooking result based on detection of foodstuffs using various sensors and a machine-learned model. In particular, the disclosed technology can be used to generate an inferred cooking result that includes an image of foodstuff as it is predicted to appear after being cooked at a recommended cooking time at a recommended temperature. For example, the system can use cameras, thermometers, and a scale to create input for a machine-learned model that is configured to generate an image of foodstuff as it is predicted to appear after being cooked for some amount of time at a particular cooking temperature. Further, the system can infer the appearance of foodstuff after it has been cooked in accordance with user specified settings including a user specified cooking time and a user specified cooking temperature.

The system can include a cooking appliance and a computing device that can use a machine-learned model to generate an inferred cooking result based on operations performed on an input that includes an image of an object (e.g., foodstuff) as well as the temperature and mass of the object. The inferred cooking result can include an inferred image of the object as it is predicted to appear after a recommended cooking time at a recommended cooking temperature. For example, an image of foodstuff (e.g., a portion of chicken that was placed on a cooktop of the system) can be captured by a camera assembly of the system. Further, the mass and temperature of the system can be determined based on signals from a respective mass assembly and thermal assembly of the system. The combination of the image, mass, and temperature of the foodstuff can be part of an input to a machine-learning model that is configured to generate an inferred cooking result that can include an image of the foodstuff as it is predicted to appear, thereby assisting a user in achieving proper cooking results.

By way of further example, an inferred cooking result can include an inferred image of a cooked and golden brown portion of chicken as it is predicted to appear after it has been cooked for the recommended cooking time of thirty (30) minutes at a recommended cooking temperature of two-hundred (200) degrees Celsius. In the event that settings including a user specified cooking temperature or user specified cooking time have been provided by a user (e.g., entered via a user interface of the system), the system can generate an inferred cooking result that is in accordance with the settings. For example, if the user specified cooking time is two-hundred degrees and the user specified cooking time is sixty (60) minutes, the inferred image of the portion of chicken may appear blackened to reflect a predicted appearance of foodstuff that has been overcooked. As such, the disclosed technology can provide numerous advantages and benefits including improving the cooking outcomes of a cooking appliance by providing a user with an inferred cooking result that can include a visual representation of what foodstuff is predicted to look like after it has been cooked.

Furthermore, the systems, methods, devices, apparatuses, and/or tangible non-transitory computer-readable media in the disclosed technology can provide a variety of technical effects and benefits including an improvement in cooking safety, reduced food wastage, and improved energy efficiency. For example, the disclosed technology can improve cooking safety by providing a user with a recommended cooking time and recommended cooking temperature that will result in food that is cooked for a long enough amount of time and/or a high enough temperature to neutralize or reduce the effect of potentially harmful germs that can be present in foodstuffs. Further, the disclosed technology can notify a user when user specified settings (e.g., user specified cooking time settings and/or user specified temperature settings) may result in food that has not been cooked for long enough and/or at a high enough temperature.

Additionally, the disclosed technology can reduce food wastage by providing an inferred cooking result that can include a recommended cooking time and/or recommended cooking temperature that will not overcook (e.g., cook the food for too long) or overheat (e.g., cook the food at too high of a temperature) the food that is provided by a user. An appropriate and safe cooking time can reduce food that is thrown away due to being overcooked and/or overheated.

Furthermore, the disclosed technology can improve the energy efficiency of a cooking appliance by generating cooking recommendations including a recommended cooking time and/or recommended cooking temperature. For example, the system can provide a recommended cooking time that will properly cook food with less usage of energy than a user specified cooking time that may overcook the food. Further, the system can provide a recommended cooking temperature that will properly cook food at a lower temperature than a user specified temperature that may overheat the food.

Accordingly, the disclosed technology can result in a host of specific advantages and benefits associated with the operation of a cooking appliance. Further, the advantages and benefits provided by the disclosed technology can result in tangible improvements to systems, appliances, devices, and methods associated with the operation of cooking appliances and cooking systems in general, and inferring cooking results in particular.

Figure 2:
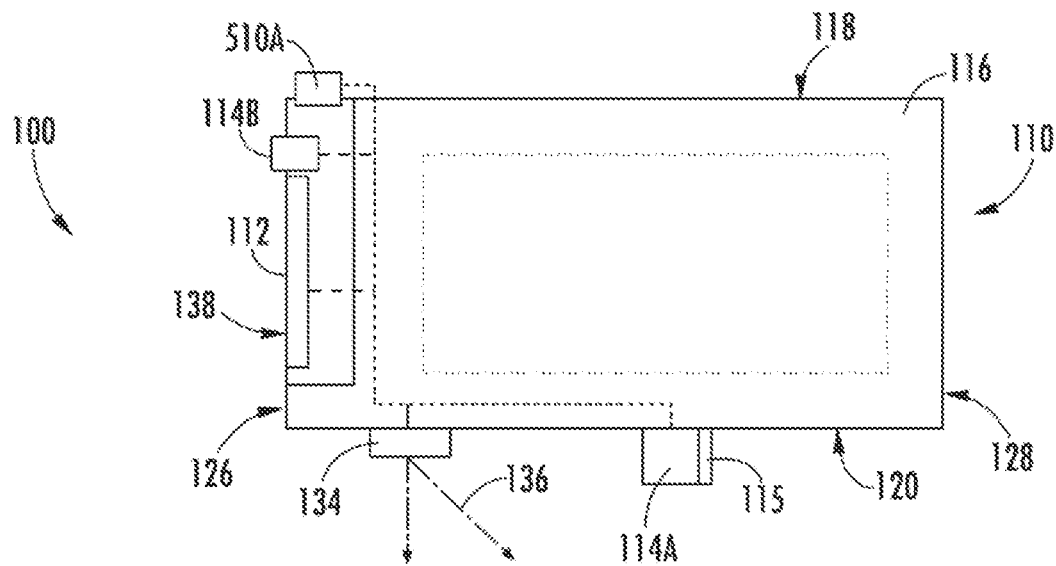
FIG. 2 provides a side schematic view of the exemplary system of FIG. 1.
Figure 2:
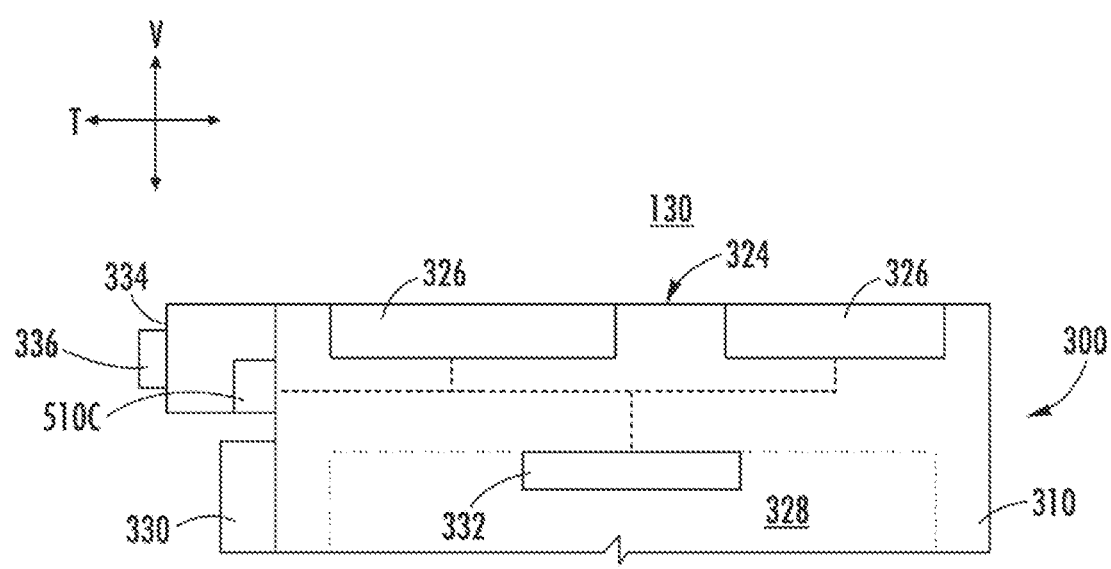
Figure 3:
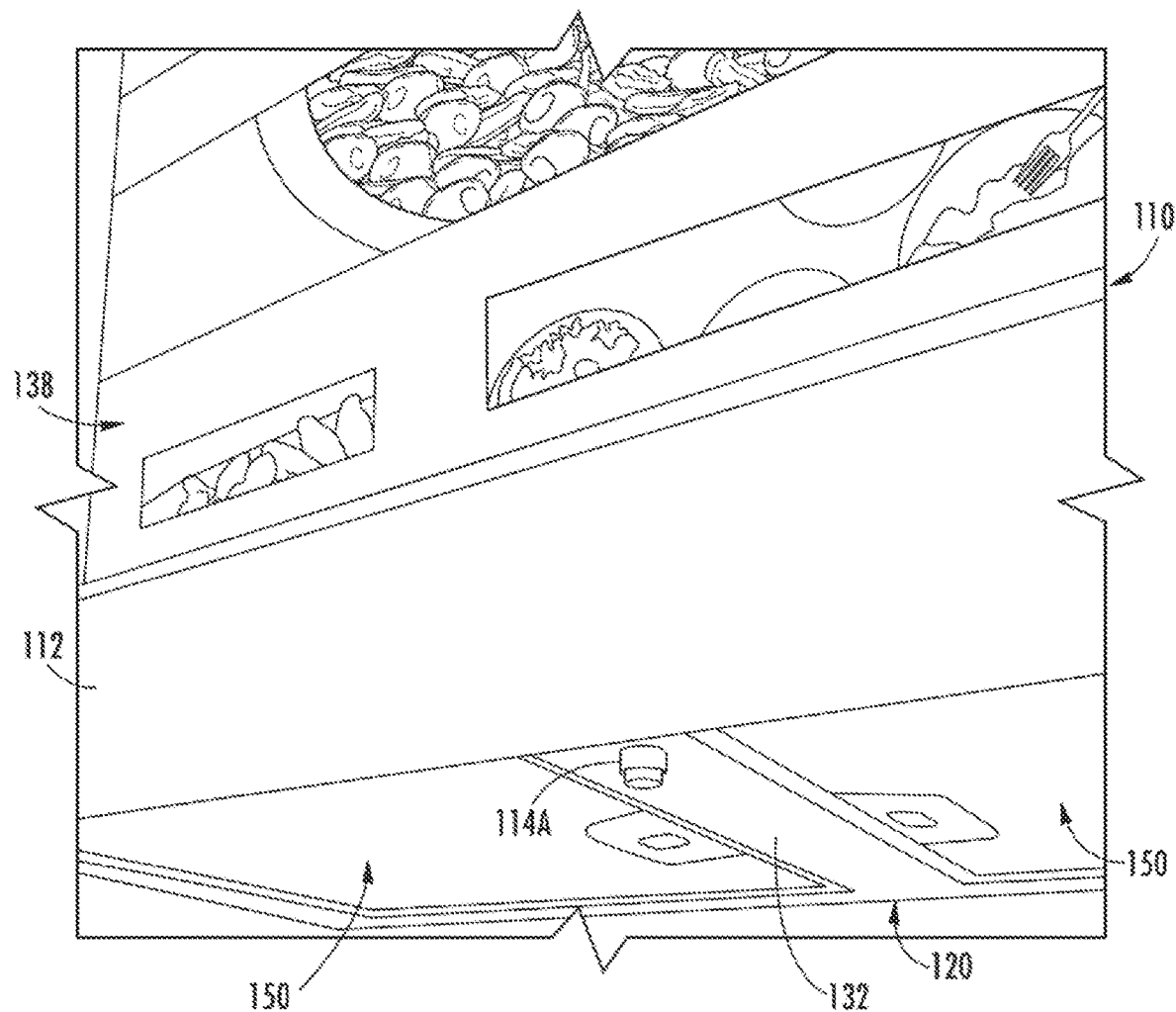
FIG. 3 provides a bottom perspective view of a portion of the exemplary system of FIG. 1.

Turning to the figures, FIGS. 1-3 provide various views of a system 100 according to exemplary embodiments of the present disclosure. System 100 generally includes an interactive assembly 110 having a controller 510A in operable communication with an image monitor 112, one or more camera assemblies (e.g., camera assembly 114A, camera assembly 114B, and/or camera assembly 114C) that can be positioned above a cooktop appliance 300, a mass sensor assembly 140, and/or a thermal sensor assembly 142.

The system 100 can include one or more processors (e.g., the one or more processors 512A, the one or more processors 512B, the one or more processors 512C, the one or more processors 512D, and/or the one or more processors 512E) and/or one or more memory devices (e.g., the one or more memory devices 514A, the one or more memory devices 514B, the one or more memory devices 514C, the one or more memory devices 514D, and/or the one or more memory devices 514E). The one or more memory devices can store computer-readable instructions that, when executed by the one or more processors, cause the one or more processors to perform operations. The operations performed by the one or more processors can include accessing an image signal; accessing a mass signal including an image of at least one object; accessing a temperature signal; and generating an inferred cooking result that is based at least in part on a machine-learned model (e.g., the machine-learned model 416) that is configured to perform operations on an input including the image signal, the mass signal, and the temperature signal. The inferred cooking result can include an inferred image of the at least one object as it is predicted to appear after a recommended cooking time at a recommended temperature.

As shown cooktop appliance 300 defines a vertical direction V, a lateral direction L, and a transverse direction T, for example, at a cabinet 310. The vertical, lateral, and transverse directions are mutually perpendicular and form an orthogonal direction system. As shown, cooktop appliance 300 extends along the vertical direction V between a top portion 312 and a bottom portion 314; along the lateral direction L between a left side portion and a right side portion; and along the traverse direction T between a front portion and a rear portion.

Cooktop appliance 300 can include a chassis or cabinet 310 and a cooktop surface 324 having one or more heating elements 326 for use in, for example, heating or cooking operations. In one example embodiment, cooktop surface 324 is constructed with ceramic glass. In other embodiments, however, cooktop surface 324 may include of another suitable material, such as a metallic material (e.g., steel) or another suitable non-metallic material. Heating elements 326 may be various sizes and may employ any suitable method for heating or cooking an object, such as a cooking utensil (not shown), and its contents. In one embodiment, for example, heating element 326 uses a heat transfer method, such as electric coils or gas burners, to heat the cooking utensil. In another embodiment, however, heating element 326 uses an induction heating method to heat the cooking utensil directly. In turn, heating element 326 may include a gas burner element, resistive heat element, radiant heat element, induction element, or another suitable heating element.

In some embodiments, cooktop appliance 300 includes an insulated cabinet 310 that defines a cooking chamber 328 selectively covered by a door 330. One or more heating elements 332 (e.g., top broiling elements or bottom baking elements) may be enclosed within cabinet 310 to cooking chamber 328. Heating elements 332 within cooking chamber 328 may be provided as any suitable element for cooking the contents of cooking chamber 328, such as an electric resistive heating element, a gas burner, microwave element, halogen element, etc. Thus, cooktop appliance 300 may be referred to as an oven range appliance. As will be understood by those skilled in the art, cooktop appliance 300 is provided by way of example only, and the present subject matter may be used in any suitable cooking appliance, such as a double oven range appliance or a standalone cooktop (e.g., fitted integrally with a surface of a kitchen counter) Thus, the example embodiments illustrated in figures are not intended to limit the present subject matter to any particular cooking chamber or heating element configuration, except as otherwise indicated.

The cooktop appliance 300 can include a mass sensor assembly 140 that is in operable communication with a controller including the controller 510A. The mass sensor assembly 140 can be located beneath the cooktop surface 324 and/or within the cooking chamber 328. The mass sensor assembly 140 can be configured to measure and/or determine the mass and/or weight of one or more objects (e.g., one or more foodstuffs) that are placed on the mass sensor assembly 140, the cooktop surface 324, and/or the cooking chamber 328. By way of example, foodstuff can be on or in the cooking appliance 300 and can include one or more foods including any vegetable, fruit, meat (e.g., beef, fish, and/or poultry), grain (e.g., rice or wheat), corn, potatoes, dairy, eggs, and/or beans. Further, foodstuff can include any combination of prepared, semi-prepared, and/or raw foods. Foodstuff 404 can be in a container, sheet, and/or vessel that can support the foodstuff (e.g., a pot, a pan, a baking sheet, baking paper, and/or aluminum foil sheet). Further, foodstuff can, for example, be on the cooktop surface 324 or inside the cooking chamber 328. The mass sensor assembly 140 can generate output including a mass and/or weight of an object that is on the mass sensor assembly 140. For example, the mass sensor assembly can generate output including a mass in kilograms of foodstuffs that are located on top of the mass sensor assembly 140.

The cooktop appliance 300 can include a thermal sensor assembly 142 that is in operable communication with a controller including the controller 510A. The thermal sensor assembly 142 can be located beneath the cooktop surface 324, within the cooking chamber 328, and/or at a location that is external to the cooktop surface 324 and/or the cooking chamber 328. For example, the thermal sensor assembly 142 can be configured to detect the temperature of one or more objects within the cooktop surface 324 and/or the cooking chamber 328 without contacting either the cooktop surface 324 and/or the cooking chamber 328. In some embodiments, the thermal sensor assembly 142 can include an infrared sensor that is configured to measure and/or determine the temperature of an object based at least in part on detection of electromagnetic waves in the infrared spectrum.

The thermal sensor assembly 142 can be configured to measure and/or determine the temperature of one or more objects (e.g., one or more foodstuffs) that are placed on the thermal sensor assembly 142, the cooktop surface 324, and/or the cooking chamber 328. The mass sensor assembly 140 can generate output including a temperature (e.g., a temperature in Celsius, Fahrenheit, or Kelvin) of an object that is on the thermal sensor assembly 142. For example, the thermal sensor assembly 142 can generate output including a temperature in Celsius of foodstuffs that are located within the cooking chamber 328 and/or the cooktop surface 324.

As illustrated, a user interface panel 334 may be provided on cooktop appliance 300. Although shown at front portion of cooktop appliance 300, another suitable location or structure (e.g., a backsplash) for supporting user interface panel 334 may be provided in alternative embodiments. In some embodiments, user interface panel 334 includes input components or controls 336, such as one or more of a variety of electrical, mechanical, or electro-mechanical input devices. Controls 336 may include, for example, rotary dials, knobs, push buttons, and touch pads. A controller 510C is in communication with user interface panel 334 and controls 336 through which a user may select various operational features and modes and monitor progress of cooktop appliance 300. In additional or alternative embodiments, user interface panel 334 includes a display component, such as a digital or analog display in communication with a controller 510C and configured to provide operational feedback to a user. In certain embodiments, user interface panel 334 represents a general purpose I/O ("GPIO") device or functional block.

In some embodiments, the image monitor 112 and/or the user interface panel 334 can be configured to generate one or more indications including one or more sounds (e.g., beeping, chiming, ringing, prerecorded speech, and/or synthetic speech). For example, the image monitor 112 and/or the user interface panel 334 can include one or more loudspeakers that can be used to provide information including an inferred cooking result and/or an indication including an indication that a user specified cooking time exceeds a recommended cooking time and/or an indication that a user specific cooking temperature exceeds a recommended temperature.

In some embodiments, the user interface panel 334 can display a user interface that is configured to receive one or more user inputs. The one or more inputs can be associated with one or more objects (e.g., a food item that is on the cooktop surface 324 and/or in the cooking chamber 328. The one or more user inputs can be associated with one or more settings that can be used to control the cooktop surface 324 and/or the cooking chamber 328. The one or more settings can include a user specified cooking time (e.g., a time in hours, minutes, and/or seconds) and a user specified cooking temperature (e.g., a temperature in degrees Celsius). In some embodiments, the one or more settings can be used as part of the input to a machine-learned model that is implemented by the controller 510A.

Figure 5:
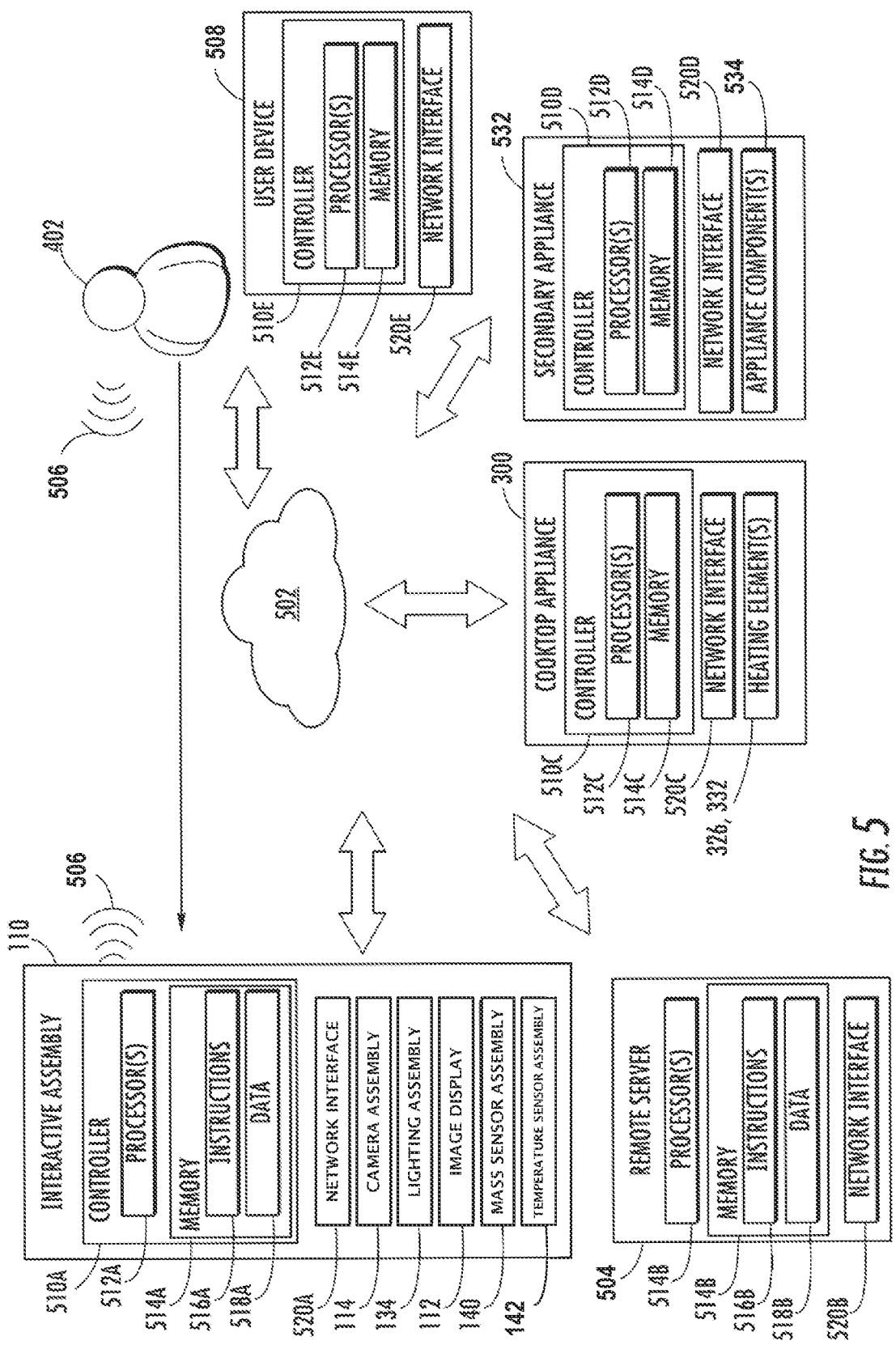
FIG. 5 provides a schematic view of a system for engaging one or more appliances according to exemplary embodiments of the present disclosure.

As shown, controller 510C can be communicatively coupled (i.e., in operative communication) with user interface panel 334 and its controls 336. Controller 510C may also be communicatively coupled with various operational components of cooktop appliance 300 as well, such as heating elements (e.g., 326, 332), sensors, etc. Input/output ("I/O") signals may be routed between controller 510C and the various operational components of cooktop appliance 300. Thus, controller 510C can selectively activate and operate these various components. Various components of cooktop appliance 300 are communicatively coupled with controller 510C via one or more communication lines such as, for example, conductive signal lines, shared communication busses, or wireless communications bands, In some embodiments, controller 510C includes one or more memory devices 514C and one or more processors 512C (FIG. 5). The processors 512C can be any combination of general or special purpose processors, CPUs, or the like that can execute programming instructions or control code associated with operation of cooktop appliance 300. The memory devices 514C (i.e., memory) may represent random access memory such as DRAM or read only memory such as ROM or FLASH. In one embodiment, the processor 512C executes programming instructions stored in memory 514C. The memory 514C may be a separate component from the processor 512C or may be included onboard within the processor 512C. Alternatively, controller 510C may be constructed without using a processor, for example, using a combination of discrete analog or digital logic circuitry (such as switches, amplifiers, integrators, comparators, flip-flops, AND gates, and the like) to perform control functionality instead of relying upon software.

In certain embodiments, controller 510C includes a network interface 520C (FIG. 5) such that controller 510C can connect to and communicate over one or more networks (e.g., the network 502 that is depicted in FIG. 5) with one or more network nodes. Controller 510C can also include one or more transmitting, receiving, or transceiving components for transmitting/receiving communications with other devices communicatively coupled with cooktop appliance 300. Additionally or alternatively, one or more transmitting, receiving, or transceiving components can be located off board controller 510C. Generally, controller 510C can be positioned in any suitable location throughout cooktop appliance 300. For example, controller 510C may be located proximate user interface panel 334 toward front portion of cooktop appliance 300.

In some embodiments, cooktop controller 510C is provided as or as part of controller 510A. In alternative embodiments, cooktop controller 510C is a discrete unit in selective operable communication with controller 510A, as will be described in detail below.

As shown, one or more casings (e.g., hood casing 116) may be provided above cooktop appliance 300 along the vertical direction V. For example, a hood casing 116 may be positioned above cooktop appliance 300. Hood casing 116 includes a plurality of outer walls and generally extends along the vertical direction V between a top end 118 and a bottom end 120; along the lateral direction L between a first side end 122 and a second side end 124; and along the transverse direction T between a front end 126 and a rear end 128. In some embodiments, hood casing 116 is spaced apart from cooktop surface 324 along the vertical direction V. An open region 130 may thus be defined along the vertical direction V between cooktop surface 324 and bottom end 120.

In optional embodiments, hood casing 116 is formed as a range hood. However, a range hood is provided by way of example only. Other configurations may be used within the spirit and scope of the present disclosure. For example, hood casing 116 could be part of a microwave or other appliance designed to be located over cooktop surface 324. Moreover, although a generally rectangular shape is illustrated, any suitable shape or style may be adapted to form the structure of hood casing 116.

In certain embodiments, one or more camera assemblies 114A, 114B, and/or 114C are provided to capture images (e.g., static images or dynamic video) of a portion of cooktop appliance 300 or an area adjacent to cooktop appliance 300. Generally, each camera assembly 114A, 114B, and/or 114C may be any type of device suitable for capturing a picture or video. As an example, each camera assembly 114A, 114B, and/or 114C may be a video camera or a digital camera with an electronic image sensor (e.g., a charge coupled device (CCD) or a CMOS sensor). In some embodiments, the one or more camera assemblies can include an image sensor that is configured to detect light in the visible spectrum.

The one or more camera assemblies 114 are in operable communication with controller 510A such that controller 510A may receive an image signal from camera assembly 114A, 114B, and/or 114C corresponding to the picture captured by camera assembly 114A, 114B, and/or 114C. Once received by controller 510A, the image signal may be further processed at controller 510A or transmitted to a separate device (e.g., remote server 504—FIG. 5) in live or real-time for remote viewing (e.g., via one or more social media platforms). Optionally, one or more microphones (not pictured) may be associated with one or more of the camera assemblies 114A, 114B, and/or 114C to capture and transmit audio signal(s) coinciding (or otherwise corresponding) with the captured image signal(s). In some embodiments, the one or more camera assemblies 114A, 114B, and/or 114C can include one or more image sensors that are configured to detect light in the visible light spectrum and/or the infrared spectrum.

In some embodiments, one camera assembly (e.g., the first camera assembly 114A) is directed at the cooktop surface 324. In other words, first camera assembly 114A is oriented to capture light emitted or reflected from cooktop surface 324 through the open region 130. Further, the camera assembly 114A can capture an image of at least one object (e.g., foodstuff) that is within the cooking chamber 328. The camera assembly 114B can also generate an image signal that can include a representation and/or image of at least one object on the cooktop surface 324. Thus, first camera assembly 114A may selectively capture an image covering all or some of cooktop surface 324. For instance, first camera assembly 114A may capture an image covering one or more heating elements 326 of cooktop appliance 300. Optionally, first camera assembly 114A may be directed such that a line of sight is defined from first camera assembly 114A that is perpendicular to cooktop surface 324.

In some embodiments, one or more camera assemblies (e.g., the camera assembly 114C) is directed at the cooking chamber 328. The camera assembly 114C can be oriented to capture light emitted or reflected from within the cooking chamber 328. Further, the camera assembly 114C can capture an image of at least one object (e.g., foodstuff) that is within the cooking chamber 328. The camera assembly 114C can also generate an image signal that can include a representation and/or image of at least one object inside the cooking chamber 338. In some embodiments, one or more camera assemblies (e.g., the camera assembly 114C) can be located within the cooking chamber 328 (e.g., on a top or upper portion of the cooking chamber 328) and can capture an image (and generate an image signal based on the image) of one or more objects located within the cooking chamber 328. In some embodiments, the camera assembly 114C is located outside the cooking chamber 338 and can capture an image of at least one object inside the cooking chamber 338 through an aperture or transparent portion (e.g., a window) of the cooking chamber 338. For example, the door 330 of the cooking chamber 338 can include a window (e.g., a glass window) that allows the interior of the cooking chamber 338 to be visible from outside the cooking chamber 338. Further, a window of the cooking chamber 338 can allow the camera assembly 114C to capture an image of at least one object inside the cooking chamber 338.

Further, the camera assembly 114C may selectively capture an image covering all or some of cooktop surface 324. For instance, the camera assembly 114C may capture an image covering one or more heating elements 326 of cooktop appliance 300. Optionally, first camera assembly 114A may be directed such that a line of sight is defined from first camera assembly 114A that is perpendicular to cooktop surface 324.

As shown, first camera assembly 114A is positioned above cooktop surface 324 (e.g., along the vertical direction V). In some such embodiments, first camera assembly 114A is mounted (e.g., fixedly or removably) to hood casing 116. A cross-brace 132 extending across hood casing 116 (e.g., along the transverse direction T) may support first camera assembly 114A. When assembled, first camera assembly 114A may be positioned directly above cooktop surface 324.

In additional or alternative embodiments, another camera assembly (e.g., second camera assembly 114B) is directed away from cooktop surface 324. In other words, second camera assembly 114B is oriented to capture light emitted or reflected from an area other than cooktop surface 324. In particular, second camera assembly 114B may be directed at the area in front of cooktop appliance 300 (e.g., directly forward from cooktop appliance 300 along the transverse direction T). Thus, second camera assembly 114B may selectively capture an image of the area in front of cooktop surface 324. This area may correspond to or cover the location where a user would stand during use of one or more heating elements 326. During use, a user's face or body may be captured by second camera assembly 114B while the user is standing directly in front of cooktop appliance 300. Optionally, second camera assembly 114B may be directed such that a line of sight is defined from second camera assembly 114B that is non-orthogonal to cooktop surface 324 (e.g., between 0° and 45° relative to a plane parallel to cooktop surface 324). The captured images from second camera assembly 114B may be suitable for transmission to a remote device or may be processed as a gesture control signal for a portion of interactive assembly 110 (e.g., to engage a graphical user interface displayed at image monitor 112).

As shown, second camera assembly 114B is positioned above cooktop surface 324 (e.g., along the vertical direction V). In some such embodiments, such as that illustrated in FIGS. 1 and 2, second camera assembly 114B is mounted (e.g., fixedly or removably) to a front portion of hood casing 116 (e.g., at image monitor 112). When assembled, second camera assembly 114B may be positioned directly above cooktop surface 324 or, additionally, forward from cooktop appliance 300 along the transverse direction T.

In some embodiments, a lighting assembly 134 is provided above cooktop surface 324 (e.g., along the vertical direction V). For instance, lighting assembly 134 may be mounted to hood casing 116 (e.g., directly above cooktop surface 324). Generally, lighting assembly 134 includes one or more selectable light sources directed toward cooktop surface 324. In other words, lighting assembly 134 is oriented to project a light (as indicated at arrows 136) to cooktop appliance 300 through open region 130 and illuminate at least a portion of cooktop surface 324. The light sources may include any suitable light-emitting elements, such as one or more light emitting diode (LED), incandescent bulb, fluorescent bulb, halogen bulb, etc.

During use, lighting assembly 134 may be selectively activated to illuminate a portion of cooktop appliance 300 (e.g., cooktop surface 324) based on a received light visibility signal. For instance, lighting assembly 134 may be activated by controller 510A based on direct user input (e.g., depressing a dedicated switch, a gesture control signal, voice control signal, etc.). In other words, the light visibility signal may be an isolated user input signal.

Alternatively, the light visibility signal may be an automatically-generated signal that does not require direct user input. The light visibility signal may indicate additional light is needed above cooktop appliance 300. In turn, controller 510A may automatically activate lighting assembly 134 based on a determined condition. Optionally, controller 510A may vary the activation or light intensity (i.e., luminance) of the light 136 from lighting assembly 134 based on the ambient conditions (e.g., through the open region 130 between cooktop surface 324 and hood casing 116). For instance, an ambient light sensor 115 may be positioned above cooktop surface 324 (e.g., directly above cooktop surface 324). In some such embodiments, ambient light sensor 115 detects the light available at first camera assembly 114A and transmits a corresponding light visibility signal to controller 510A. Based on the received light visibility signal, controller 510A may direct lighting assembly 134 to activate/deactivate or increase/decrease the intensity of light 136 projected towards cooking surface.

In some embodiments, image monitor 112 is provided above cooktop surface 324 (e.g., along the vertical direction V). In some embodiments, the image monitor 112 can be located at different portions of the appliance 300. For example, the image monitor 112 can be located on a side of the cooktop appliance 300 or as part of the user interface panel 334. By way of further example, image monitor 112 may be mounted to hood casing 116 (e.g., directly above cooktop surface 324). Generally, image monitor 112 may be any suitable type of mechanism for visually presenting a digital (e.g., interactive) image. For example, image monitor 112 may be a liquid crystal display (LCD), an organic light emitting diode (OLED) display, a plasma display panel (PDP), a cathode ray tube (CRT) display, etc. Thus, image monitor 112 includes an imaging surface 138 (e.g., screen or display panel) at which the digital image is presented or displayed as an optically-viewable picture (e.g., static image or dynamic video) to a user. The optically-viewable picture may correspond to any suitable signal or data received or stored by interactive assembly 110 (e.g., at controller 510A). As shown in FIG. 3, the imaging surface 138 includes images of foodstuff (prior to being cooked) in the cooking chamber 338 that was captured by the one or more camera assemblies 114. The image monitor 112 may present and/or display information in the form of viewable text or images. For example, the image monitor 112 can display a user interface that is configured to receive and/or obtain one or more user inputs. The one or more user inputs can include one or more settings that can be used to control the cooktop appliance 300. The one or more settings can include a user specified cooking time (e.g., a time in hours, minutes, and/or seconds) and a user specified cooking temperature (e.g., a temperature in degrees Celsius). In some embodiments, the one or more settings can be used as part of the input to the machine-learned model that is implemented by the controller 510A. As another example, image monitor 112 may present a remotely captured image, such as a live (e.g., real-time) dynamic video stream received from a separate user or device. As yet another example, image monitor 112 may present a graphical user interface (GUI) that allows a user to select or manipulate various operational features of interactive assembly 110 or cooktop appliance 300. During use of such GUI embodiments, a user may engage, select, or adjust the image presented at image monitor 112 through any suitable input, such as gesture controls detected through second camera assembly 114B, voice controls detected through one or more microphones, associated touch panels (e.g., capacitance or resistance touch panel) or sensors overlaid across imaging surface 138, etc.

In some example embodiments, the image monitor 112 has touchscreen capability. Accordingly, the image monitor 112 can include a touchscreen display that is configured to detect one or more inputs which can include input from a user. For example, a user may touch various images displayed on the image monitor 112 in order to control and/or perform various operations including operations associated with appliances communicatively coupled with controller 150, and other features, (e.g., controlling a camera, a microphone, etc.).

The optically-viewable image at the imaging surface 138 of image monitor 112 may correspond to any suitable signal or data received or stored by interactive assembly 110 (e.g., at controller 150). For example, image monitor 112 may present and/or display an image of an object that is positioned on or within the cooking chamber 328. Further, the image monitor 112 can present and/or display information in the form of viewable text and/or images. For example, the image monitor 112 can be configured to display output including one or more images of one or more objects on the cooktop surface 324, one or more images of one or more objects in the cooking chamber 328, the inferred cooking result, and/or the inferred cooking image. By way of further example, image monitor 112 may present a remotely captured image, such as a live (e.g., real-time) dynamic video stream received from a separate user or device. As yet another example, image monitor 112 may present a graphical user interface (GUI) that allows a user to select or manipulate various operational features of interactive assembly 110, cooktop appliance 180, or other components communicatively coupled with controller 150, e.g., via image monitor's touchscreen capabilities described above. During use of such GUI embodiments, a user may engage, select, or adjust the image presented at image monitor 112 through any suitable input, such as gesture controls detected through a camera assembly, voice controls detected through one or more microphones, associated touch panels (e.g., capacitance or resistance touch panel) or sensors overlaid across imaging surface 138, etc.

As illustrated, the imaging surface 138 generally faces, or is directed away from, cooktop surface 324. In particular, the imaging surface 138 is directed toward the area forward from the cooktop appliance 300. During use, a user standing in front of cooktop appliance 300 may thus see the optically-viewable picture (e.g., recipe, dynamic video stream, graphical user interface, etc.) displayed at the imaging surface 138. Optionally, the imaging surface 138 may be positioned at a rearward non-orthogonal angle relative to the vertical direction. In other words, the imaging surface 138 may be inclined such that an upper edge of the imaging surface 138 is closer to the rear end 128 of hood casing 116 than a lower edge of the imaging surface 138 is. In some such embodiments, the non-orthogonal angle is between 1° and 15° relative to the vertical direction V. In certain embodiments, the non-orthogonal angle is between 2° and 7° relative to the vertical direction V.

Figure 4:
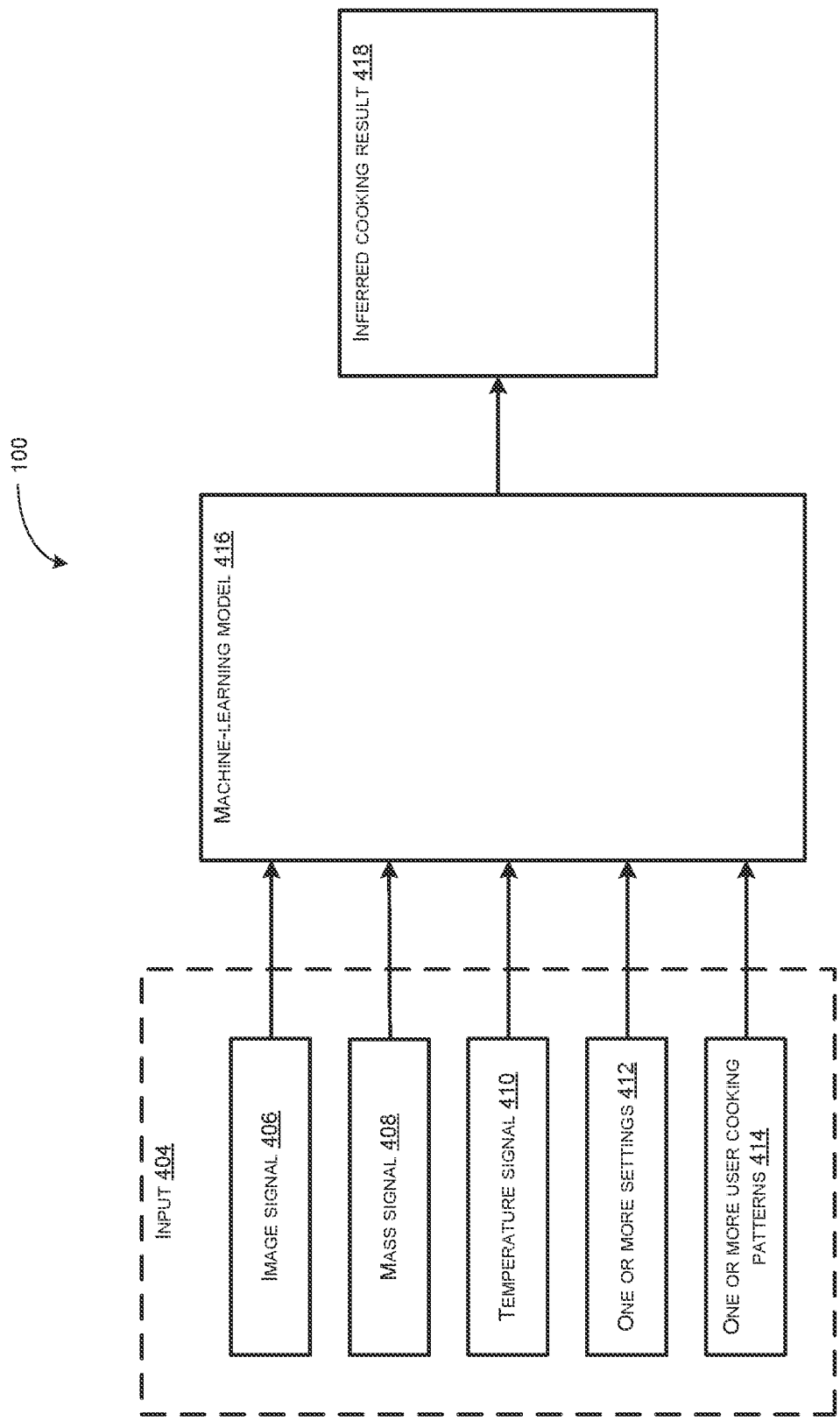
FIG. 4 illustrates a diagram of an input, operations, and output of a machine-learning system of the exemplary system of FIG. 1 according to exemplary embodiments of the present disclosure.

FIG. 4 illustrates a diagram of an input, operations, and output of a machine-learning system of an exemplary system according to exemplary embodiments of the present disclosure. The operations described in FIG. 4 can be performed by the system 100 and in particular can be implemented and/or executed on one or more of the interactive assembly 110, the cooktop appliance 300, the remote server 303, the user device 508, and/or the secondary appliance 532. As shown in FIG. 4, an input 404 can include information and/or data that can be communicated (e.g., sent and/or received) in the form of one or more image signals (e.g., the image signal 406), one or more mass signals (e.g., the mass signal 408), one or more temperature signals (e.g., the temperature signal 410); one or more settings 412; and/or one or more user cooking patterns 414; a machine-learned model 416 that can access and/or receive the input 404 and perform operations (e.g., one or more result inference operations) on the input 404; and an inferred cooking result 418 that is generated by the machine-learned model 416.

The image signal 404 can be based at least in part on one or more images generated by the one or more camera assemblies (e.g., the camera assembly 114) and can include information and/or data associated with an image of at least one object (e.g., foodstuff) that is on the cooktop 324 and/or the cooking chamber 328. For example, the image signal 406 can include an image of a piece of salmon that is placed on a baking sheet inside the cooking chamber 328. In some embodiments, the image signal 404 can be received from a remote computing device (e.g., the user device 508). Further, the image signal 404 can include a depiction of the at least one object captured by a camera or other image capture device of the remote computing device (e.g., the user device 508).

The mass signal 408 can be based at least in part on the mass and/or weight of one or more objects that are on the cooktop 324 or inside the cooking chamber 328. The mass signal 408 can be generated by the mass assembly 140. By way of example, the mass signal 408 can indicate the mass (measured in grams) of the piece of salmon that is placed on a baking sheet inside the cooking chamber 328.

The mass signal 408 can be based at least in part on the mass and/or weight of one or more objects that are on the cooktop 324 or inside the cooking chamber 328. The mass signal 408 can be generated by the mass assembly 140. By way of example, the mass signal 408 can indicate the mass (measured in grams) of the piece of salmon that is placed on a baking sheet inside the cooking chamber 328.

The temperature signal 410 can be based at least in part on the temperature of one or more objects that are on the cooktop 324 or inside the cooking chamber 328. The temperature signal 410 can be generated by the temperature assembly 142. By way of example, the temperature signal 410 can indicate the temperature (measured in degrees Celsius) of the piece of salmon that is placed on a baking sheet inside the cooking chamber 328.

The one or more settings 412 can include one or more settings that can adjust the operation of the cooktop appliance 300 and including adjusting the temperature and/or cooking time of one or more objects (e.g., foodstuff) on the cooktop 324 and/or inside the cooking chamber 328. For example, the one or more settings 412 can indicate that foodstuff will be cooked at a user specified cooking temperature and/or that foodstuff will be cooked for a user specified cooking time. By way of example, the one or more settings 412 can indicate that an object in the cooking chamber will be cooked at a temperature of one-hundred and fifty (150) degrees Celsius for a time period of one (1) hour.

The one or more user cooking patterns 414 can include one or more previously determined patterns of a user that can adjust the operation of the cooktop appliance 300. Further, the one or more user cooking patterns 414 can be used to adjust the recommended temperature and/or the recommended cooking time of one or more objects (e.g., foodstuff) on the cooktop 324 and/or inside the cooking chamber 328. For example, the one or more user cooking patterns 414 can indicate how well done a user prefers their meat to be cooked. As such, the recommended cooking time and/or the recommended cooking temperature can be adjusted by the machine-learned model 414, based at least in part on the one or more user cooking patterns 414. For example, if the one or more user cooking patterns 414 indicate that a user prefers well done meat, the machine-learned model 414 can generate an inferred cooking result that includes a recommended cooking time that is longer in duration and/or a recommended cooking temperature that is higher.

Any combination of the input 404 can be provided to and/or used by the machine-learned model 416. For example, the input can include the image signal 406 and the one or more settings 412 including a user specified cooking time and a user specified cooking temperature; or the image 406, the mass signal 408, and the temperature 410.

In some embodiments, the machine-learned model 416 can be implemented and/or executed by system 100. For example, the machine-learned model 416 can be implemented by the controller 510A. By way of further example, the machine-learned model 416 can be stored in the memory 514A of the controller 510A. The machine-learned model 416 can be configured and/or trained using one or more supervised learning techniques, one or more unsupervised learning techniques, and/or one or more semi-supervised learning techniques.

The machine-learned model 416 can be configured and/or trained to perform one or more operations including receiving and/or accessing the input 404, performing one or more operations (e.g., one or more result inference operations) on the input 404, and generating an output including the inferred cooking result 418, that is based at least in part on the one or more operations.

The machine-learned model 416 can include one or more recurrent neural networks (e.g., long short-term memory recurrent neural networks), one or more convolutional neural networks, one or more deep belief networks, and/or one or more generative adversarial networks (e.g., the machine-learned model 416 can be configured and/or trained using an adversarial generative network that includes a generative model and a discriminative model). Further, the machine-learned model 416 can be configured and/or trained based at least in part on training data. The training data can include a plurality of training images of objects (e.g., foodstuff) associated with a corresponding plurality of cooking times and a plurality of cooking temperatures. For example, the machine-learned model 416 can be configured and/or trained using comparisons of images of actual food that was cooked for various amounts of time at various cooking temperatures to images of the same type of food that was generated by a machine-learned model based on an image of the food in an uncooked state. Minimization of a loss associated with the difference between the image of the food that was generated by the machine-learned model and the image of the actual food can be used to adjust the weighting of parameters of the machine-learned model (e.g., the more similar the generated food image is to the actual food image, the more the loss is minimized). The parameters of the machine-learned model 416 can then be adjusted based at least in part on the contribution that those parameters make to minimizing the loss.

Further, the machine-learned model 416 can be trained to generate inferred images based at least in part on input including training data including training image signals, training mass signals, training temperature signals, training settings signals, and/or training user cooking pattern signals. Over a plurality of iterations (e.g., millions of iterations) the machine-learned model 416 can be configured and/or trained to receive input including the image signal 406 and generate the inferred cooking result 418 that includes a prediction of what the image signal 406 should look like after being cooked at a specified temperature for a specified amount of time.

Further, the machine-learned model 416 can include parameters that can be associated with analysis of one or more features of a training input including visual features of training images, the cooking temperature and/or cooking time associated with a corresponding training image, user cooking patterns, and/or user settings. The parameters of the machine-learned model 416 can be adjusted based at least in part on the contributions that each of the parameters makes with respect to minimization of a loss (e.g., a loss that is determined using a loss function that includes the parameters). Over a plurality of iterations, the parameters of the machine-learned model 416 can adjusted so that the loss is reduced, and the accuracy of the output (e.g., the inferred cooking result 418) generated by the machine-learned model 416 can be improved.

The inferred cooking result 418 can include an inferred image of the at least one object as it is predicted (by the machine-learned model 416) to appear after a recommended cooking time at a recommended temperature. For example, if the image signal 406 includes an image of a three-hundred (300) gram steak that is raw and appears reddish and pinkish, the inferred image of the steak after a recommended cooking time of twelve (12) minutes at a recommended cooking temperature of seventy-five (75) degrees Celsius will appear brownish and well done.

In some embodiments, the inferred cooking result 418 can include a depiction of the at least one object after being cooked for a user specified cooking time at a user specified cooking temperature. For example, the one or more settings 412 can be used by the machine-learned model 416 to infer the appearance of foodstuff after the foodstuff has been cooked for the user specified cooking time at a user specified cooking temperature.

In some embodiments, the machine-learned model 416 can be configured and/or trained to determine a type of the at least one object based at least in part on the image signal 406. For example, the machine-learned model 416 can perform one or more operations to recognize and/or identify visual features of the at least one object, which can then be used to determine a type of the at least one object. For example, the machine-learned model 416 can determine that an object is a particular type of meat (e.g., beef) or that the object is a particular type of grain (e.g., white rice). Further, the machine-learned model 416 can be configured and/or trained to generate the inferred cooking result 418 based at least in part on the type of the at least one object. For example, the machine-learned model 416 can generate different recommended cooking times and/or different recommended cooking temperatures based at least in part on whether the type of object is determined to be beef or chicken.

The machine-learned model 416 can be configured and/or trained to determine a size of the at least one object based at least in part on the image signal 406. For example, the machine-learned model 416 can generate different recommended cooking times and/or different recommended cooking temperatures based at least in part on how much of the cooktop surface 324 or the cooking chamber 328 is occupied by the at least one object. A larger size of an object can be positively correlated with a longer recommended cooking time and/or a higher recommended cooking temperature.

Further, the machine-learned model can be configured and/or trained to generate the inferred cooking result based at least in part on the size of the at least one object.

The inferred cooking result 418 can include a plurality of inferred cooking result images. Each of the plurality of inferred cooking result images can be associated with a corresponding plurality of inferred cooking times within a predetermined duration of the recommended cooking time. For example, the inferred cooking result 418 can generate an inferred cooking result that includes an inferred image of foodstuff accompanied by a plurality of inferred cooking result images at cooking times that are ten minutes and twenty minutes longer than the recommended cooking time. In this way, a user can compare inferred images of the foodstuff after different cooking times.

The inferred cooking result 418 can include a plurality of inferred cooking result images. Each of the plurality of inferred cooking result images can be associated with a corresponding plurality of inferred temperatures within a predetermined temperature range of the recommended temperature. For example, the inferred cooking result 418 can generate an inferred cooking result that includes an inferred image of foodstuff accompanied by a plurality of inferred cooking result images at cooking temperatures that are fifty degrees Celsius and one-hundred degrees Celsius higher than the recommended cooking temperature. In this way, a user can compare inferred images of the foodstuff at different cooking temperatures.

In some embodiments, the inferred cooking result 418 can generate information comprising a cooking time and/or a cooking temperature that is associated with a corresponding inferred image. For example, the inferred cooking result can include an image of piece of chicken that is displayed on the image monitor 112 with text indicating a cooking temperature of two-hundred (200) degrees Celsius for a cooking time of thirty (30) minutes.

The inferred cooking result 418 can be sent to various computing devices. In some embodiments, the inferred cooking result 418 can be sent to a remote computing device which can include a mobile computing device (e.g., a smartphone, a laptop computing device, a wearable computing device, and/or a desktop computing device). For example, the inferred cooking result 418 can be sent, via the network 502, to the user device 508.

FIG. 5 provides a schematic view of a system for engaging one or more appliances, such as cooktop appliance 300 and one or more secondary appliances 532, according to exemplary embodiments of the present disclosure. As shown, interactive assembly 110 can be communicatively coupled with network 502 and various other nodes, such as a remote server 504, cooktop appliance 300, one or more secondary appliances 532, and one or more user devices 508. Moreover, one or more users 402 can be in operative communication with interactive assembly 110 by various methods, including voice control or gesture recognition, for example. Additionally, or alternatively, although network 502 is shown, interactive assembly 110 cooktop appliance 300, secondary appliance 532, user device 508, or other devices within system 100 need not be communicatively coupled via network 502; rather, interactive assembly 110 and various other devices of system 100 can be communicatively coupled via any suitable wired or wireless means not over network 502, such as, for example, via physical wires, transceiving, transmitting, or receiving components.

As noted above, interactive assembly 110 may include a controller 510A operably coupled to one or more camera assemblies 114, lighting assemblies 134, image monitors 110, mass sensor assembly 140, and/or thermal sensor assembly 142. Controller 510A may include one or more processors 512A and one or more memory devices 514A (i.e., memory). The one or more processors 512A can be any suitable processing device (e.g., a processor core, a microprocessor, an ASIC, a FPGA, a microcontroller, etc.) and can be one processor or a plurality of processors that are operatively connected. The memory device 514A can include one or more non-transitory computer-readable storage mediums, such as RAM, ROM, EEPROM, EPROM, flash memory device, magnetic disks, etc., and combinations thereof. The memory devices 514A can store data 518A and instructions 516A that are executed by the processor 512A to cause interactive assembly 110 to perform operations. For example, instructions 516A could be instructions for voice recognition, instructions for gesture recognition, receiving/transmitting images or image signals from camera assembly 114, directing activation of lighting assembly 134, or projecting images at image monitor 112. The memory devices 514A may also include data 518A, which can include image data associated with one or more image signals, mass data associated with one or more mass signals, temperature data associated with one or more temperature signals, data that can be associated with one or more inferred cooking results, one or more inferred cooking images, data associated with a machine-learned model, etc., that can be retrieved, manipulated, created, or stored by processor 512A.

Controller 510A includes a network interface 520A such that interactive assembly 110 can connect to and communicate over one or more networks (e.g., network 502) with one or more network nodes. Network interface 520A can be an onboard component of controller 510A or it can be a separate, off board component. Controller 510A can also include one or more transmitting, receiving, or transceiving components for transmitting/receiving communications with other devices communicatively coupled with interactive assembly 110. Additionally or alternatively, one or more transmitting, receiving, or transceiving components can be located off board controller 510A.

Network 502 can be any suitable type of network, such as a local area network (e.g., intranet), wide area network (e.g., internet), low power wireless networks [e.g., Bluetooth Low Energy (BLE)], or some combination thereof and can include any number of wired or wireless links. In general, communication over network 502 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

In some embodiments, a remote server 504, such as a web server, is in operable communication with interactive assembly 110. The remote server 504 can be used to host a social media platform. In other words, remote server 504 may be a social media platform server. Additionally or alternatively, the remote server 504 can be used to host an information database (e.g., a settings database that can include recommended cooking temperatures, recommended cooking times for various foodstuffs, and/or previously used cooking settings). The server can be implemented using any suitable computing device(s). The remote server 504 may include one or more processors 512B and one or more memory devices 514B (i.e., memory). The one or more processors 512B can be any suitable processing device (e.g., a processor core, a microprocessor, an ASIC, a FPGA, a microcontroller, etc.) and can be one processor or a plurality of processors that are operatively connected. The memory device 512B can include one or more non-transitory computer-readable storage mediums, such as RAM, ROM, EEPROM, EPROM, flash memory devices, magnetic disks, etc., and combinations thereof. The memory devices 514B can store data 518B and instructions 516B which are executed by the processor 512B to cause remote server 504 to perform operations. For example, instructions 516B could be instructions for receiving/transmitting images or image signals, transmitting/receiving cooking settings, image signals, etc.

The memory devices 514B may also include data 518B, such as social media data, image data, etc., that can be retrieved, manipulated, created, or stored by processor 512B. The data 518B can be stored in one or more databases. The one or more databases can be connected to remote server 504 by a high bandwidth LAN or WAN, or can also be connected to remote server 504 through network 502. The one or more databases can be split up so that they are located in multiple locales.

Remote server 504 includes a network interface 520B such that interactive remote server 504 can connect to and communicate over one or more networks (e.g., network 502) with one or more network nodes. Network interface 520B can be an onboard component or it can be a separate, off board component. In turn, remote server 504 can exchange data with one or more nodes over the network 502. In particular, remote server 504 can exchange data with interactive assembly 110. Although not pictured, it is understood that remote server 504 may further exchange data with any number of client devices over the network 502. The client devices can be any suitable type of computing device, such as a general purpose computer, special purpose computer, laptop, desktop, integrated circuit, mobile device, smartphone, tablet, or other suitable computing device. In the case of a social media platform, images (e.g., static images or dynamic video), audio, or text may thus be exchanged between interactive assembly 110 and various separate client devices through remote server 504.

In certain embodiments, cooktop appliance 300 is in operable communication with interactive assembly 110 via network 502. In turn, controller 510C of cooktop appliance 300 may exchange signals with interactive assembly 110. Optionally, one or more portions of cooktop appliance 300 may be controlled according to signals received from controller 510A of interactive assembly 110. For instance, one or more heating elements 326, 332 of cooktop appliance 300 may be activated or directed to a specific heat output (e.g., in units of British Thermal Units or temperature) based on one or more instruction signals received from controller 510A of interactive assembly 110 or remote server 504.

In additional or alternative embodiments, one or more secondary appliances 532 are in operable communication with interactive assembly 110. In turn, a controller 510D of secondary appliance 532 may exchange signals with interactive assembly 110.

Returning to FIG. 5, controller 510D may include one or more processors 512D and one or more memory devices 514D (i.e., memory). The one or more processors 512D can be any suitable processing device (e.g., a processor core, a microprocessor, an ASIC, a FPGA, a microcontroller, etc.) and can be one processor or a plurality of processors that are operatively connected. The memory device 514D can include one or more non-transitory computer-readable storage mediums, such as RAM, ROM, EEPROM, EPROM, flash memory devices, magnetic disks, etc., and combinations thereof. The memory devices 514D can store data and instructions that are executed by the processor 512D to cause secondary appliance 532 to perform operations. For example, instructions could be instructions for receiving/transmitting images or image signals, directing activation of one or more appliance components 534, etc.

Controller 510D includes a network interface 520D such that secondary appliance 532 can connect to and communicate over one or more networks (e.g., network 502) with one or more network nodes. Network interface 520D can be an onboard component of controller 510D or it can be a separate, off board component. Controller 510D can also include one or more transmitting, receiving, or transceiving components for transmitting/receiving communications with other devices communicatively coupled across network 502. Additionally or alternatively, one or more transmitting, receiving, or transceiving components can be located off board controller 510D.

In certain embodiments, a user device 508 is communicatively coupled with network 502 such that user device 508 can communicate with interactive assembly 110. User device 508 can communicate directly with interactive assembly 110 via network 502. Alternatively, user 402 can communicate indirectly with interactive assembly 110 by communicating via network 502 with remote server 504, which in turn communicates with interactive assembly 110 via network 502. Moreover, user 402 can be in operative communication with user device 508 such that user 402 can communicate with interactive assembly 110 via user device 508.

User device 508 can be any type of device, such as, for example, a personal computing device (e.g., laptop or desktop), a mobile computing device (e.g., smartphone or tablet), a gaming console or controller 510A 510C 510D 510E, a wearable computing device (e.g., a smartwatch, a smart ring, a smart bracelet, or a smart necklace), an embedded computing device, a remote, or any other suitable type of user computing device. User device 508 can include one or more user device controllers 510E. Controller 510E can include one or more processors 512E and one or more memory devices 514E. The one or more processors 512E can be any suitable processing device (e.g., a processor core, a microprocessor, an ASIC, a FPGA, a controller, a microcontroller, etc.) and can be one processor or a plurality of processors that are operatively connected. The memory device (i.e., memory) can include one or more non-transitory computer-readable storage mediums, such as RAM, ROM, EEPROM, EPROM, flash memory devices, magnetic disks, etc., and combinations thereof. The memory can store data and instructions which are executed by the processor 512E to cause user device 508 to perform operations. Controller 510E a user device network interface 520E such that user device 508 can connect to and communicate over one or more networks (e.g., network 502) with one or more network nodes. Network interface 520E can be an onboard component of controller 510E or it can be a separate, off board component. Controller 510E can also include one or more transmitting, receiving, or transceiving components for transmitting/receiving communications with other devices communicatively coupled with user device 508. Additionally or alternatively, one or more transmitting, receiving, or transceiving components can be located off board controller 510E.

User device 508 can include one or more user inputs such as, for example, buttons, one or more cameras, or a monitor configured to display graphical user interfaces or other visual representations to user. For example, display can display graphical user interfaces corresponding to operational features of interactive assembly 110 such that user may manipulate or select the features to operate interactive assembly 110. Display can be a touch sensitive component (e.g., a touch-sensitive display screen or a touch pad) that is sensitive to the touch of a user input object (e.g., a finger or a stylus). For example, a user may touch the display with his or her finger and type in a series of numbers on the display. In addition, motion of the user input object relative to the display can enable user to provide input to user device 508. User device 508 may provide other suitable methods for providing input to user device 508 as well. Moreover, user device 508 can include one or more speakers, one or more cameras, or more than one microphones such that user device 508 is configured with voice control, motion detection, and other functionality.

Generally, user 402 may be in operative communication with interactive assembly 110, cooktop appliance 300, secondary appliance 532, or one or more user devices 508. In some exemplary embodiments, user 402 can communicate with devices (e.g., interactive assembly 110) using voice control 506. User 402 may also be in operative communication via other methods as well, such as visual communication.

In some embodiments, user 402 may operate interactive assembly 110 remotely. In particular, user may wish to operate operational features that include activating portions of interactive assembly 110 (e.g., camera assembly 114, lighting assembly 134, or image monitor 112), turning on cooktop appliance 300, selecting a temperature or heat setting for cooktop appliance 300, or choosing a mode of operation of interactive assembly 110.

Figure 6:
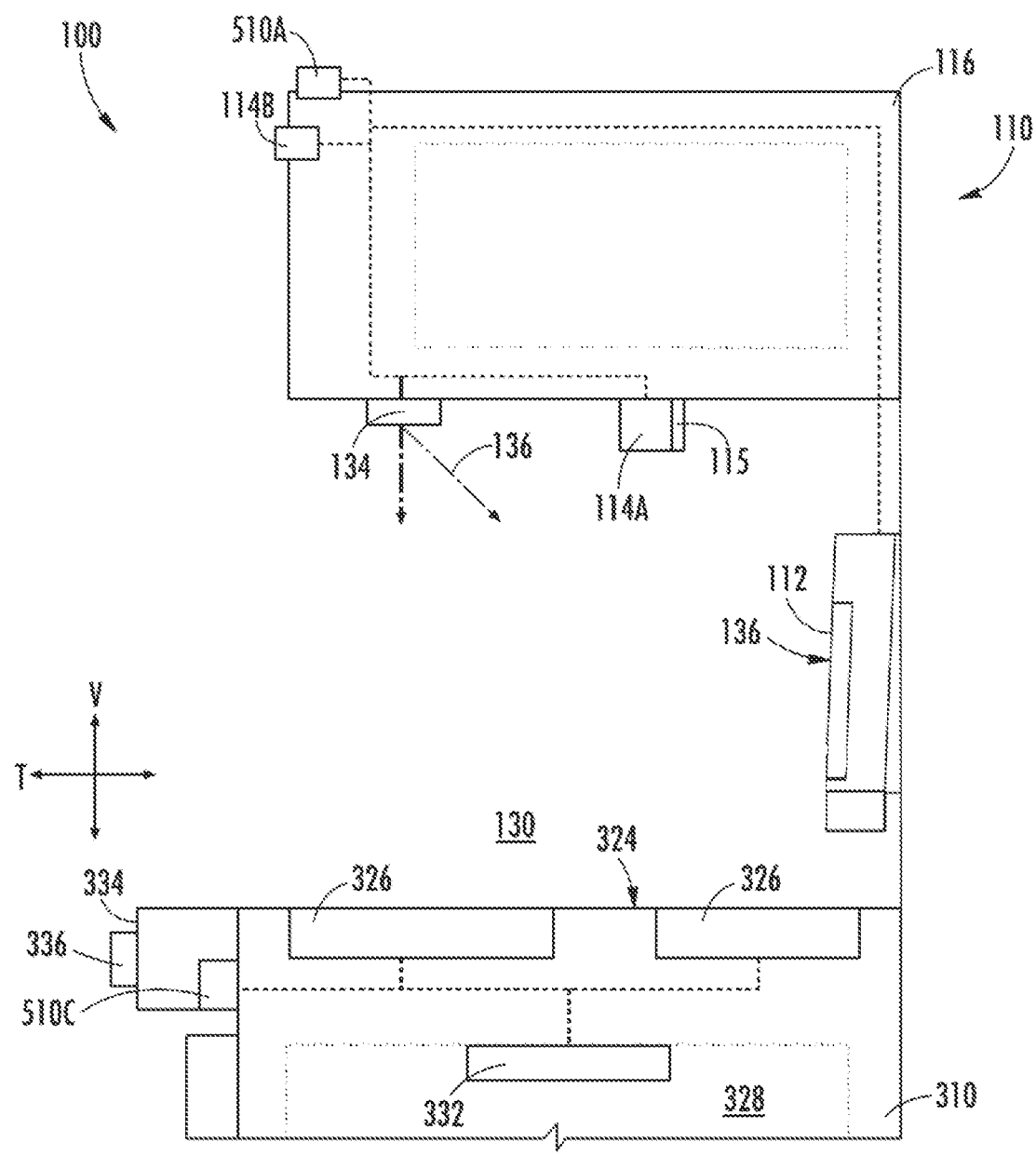
FIG. 6 provides a side schematic view of a system according to exemplary embodiments of the present disclosure.

Turning now to FIG. 6, various views are provided of system 100 according to alternative exemplary embodiments. Except as otherwise indicated, it is understood that the embodiments of FIG. 6 are substantially similar to the embodiments described above with respect to FIGS. 1 through 5. In turn, the same numerals are generally used throughout. Moreover, it is also understood that the embodiments of FIG. 6 include or could be modified to include features of the embodiments of FIGS. 1 through 5, and vice versa, except as otherwise indicated.

Figure 7:
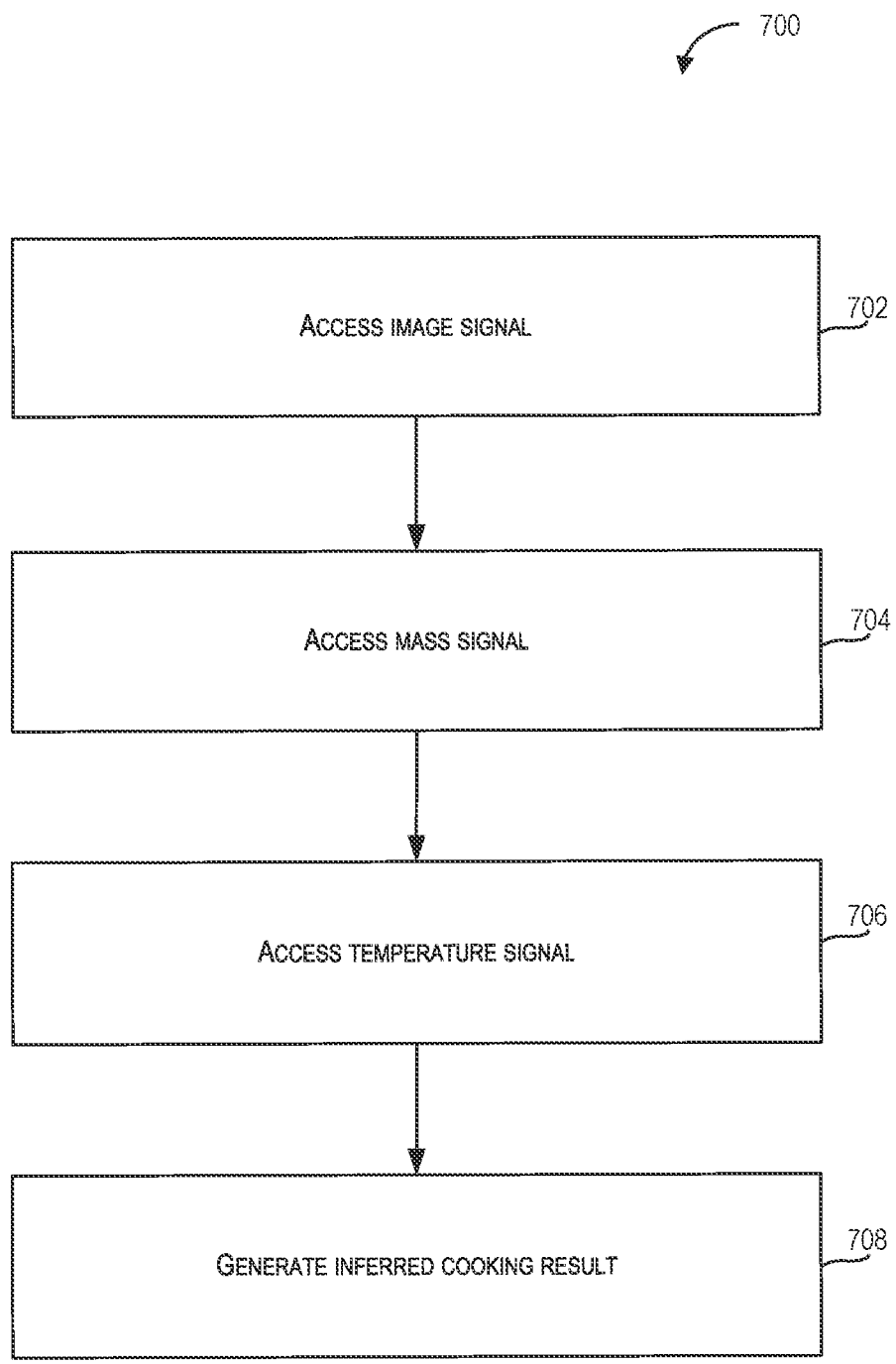
FIG. 7 provides a flow chart illustrating a method of operating a system according to exemplary embodiments of the present disclosure.

Referring now to FIG. 7, various methods may be provided for use with system 100 in accordance with the present disclosure. In general, the various steps of methods as disclosed herein may, in exemplary embodiments, be performed by the controller 510A as part of an operation that the controller 510A is configured to initiate (e.g., an interactive cooking operation). During such methods, controller 510A may receive inputs and transmit outputs from various other components of the system 100. For example, controller 510A may send signals to and receive signals from remote server 504, cooktop appliance 300, secondary appliance 532, or user device 508, as well as other components within interactive assembly 110. In particular, the present disclosure is further directed to methods, as indicated by 700, for operating system 100. Such methods advantageously facilitate sharing or viewing media (e.g., static images, dynamic video, audio, recipes, etc.) adjacent to cooktop appliance 300 and directing operations of one or more appliances. In certain embodiments, such methods may advantageously facilitate guided or recorded cooking instructions.

FIG. 7 depicts steps and/or operations performed in a particular order for purpose of illustration and discussion. Those of ordinary skill in the art, using the disclosures provided herein, will understand that (except as otherwise indicated) the steps of any of the methods disclosed herein can be modified, adapted, rearranged, omitted, or expanded in various ways without deviating from the scope of the present disclosure. Further, any part of the method 700 can be performed by the system 100 that is depicted in FIG. 1.

At 710, the method 700 can include accessing, receiving, and/or obtaining an image signal. The image signal can be from an imaging device including a camera assembly (e.g., the one or more camera assemblies including any of the camera assembly 114A-C) and/or any other type of device that can capture images of an environment. The image signal (e.g., the image signal 406) can include an image of at least one object. For example, the image signal can include an image of at least one object including foodstuff. Foodstuffs can, for example, include any comestible and/or edible item.

At 720, the method 700 can include accessing, receiving, and/or obtaining a mass signal. The mass signal can be from a mass sensor assembly (e.g., the mass sensor assembly 140) and/or a weight sensor assembly. The mass sensor assembly can include a scale, balance, and/or any other device that is used to measure the mass of an object. The weight sensor assembly can include a weighting device that is used to measure the weight of an object.

By way of example, the mass sensor assembly 140 and/or a weight sensor assembly can be configured to determine the respective mass and/or weight of at least one object on the cooktop surface 324 by measuring the force exerted on the cooktop surface 324. The mass signal can include the mass of the at least one object; and the weight signal can include the weight of the at least one object.

At 730, the method 700 can include accessing, receiving, and/or obtaining a temperature signal. The temperature signal can be from a thermal sensor assembly. The thermal sensor assembly can include a thermometer. The temperature signal can include the temperature of the at least one object. For example, the thermal sensor assembly 142 can generate a temperature signal 410 that includes a temperature of the at least one object in Celsius, Fahrenheit, or Kelvin units.

At 740, the method 700 can include generating an inferred cooking result. The inferred cooking result (e.g., the inferred cooking result 418) can be based at least in part on a machine-learned model (e.g., the machine-learned model 416) that is configured to perform operations on an input (e.g., the input 404). The input to the machine-learned model can include the image signal, the mass signal, and/or the temperature signal. In some embodiments, the input to the machine-learned model can include one or more settings and/or one or more user cooking patterns.

Further, the inferred cooking result can include an inferred image of the at least one object as it is predicted to appear after a recommended cooking time at a recommended temperature. For example, the image signal of raw beef at a temperature of ten (10) degrees can be used as part of the input to the machine-learned model which can generate an inferred image beef that appears as if the raw beef was cooked at a recommended temperature of one-hundred and fifty degrees Celsius for a recommended time of ten minutes.

Figure 8:
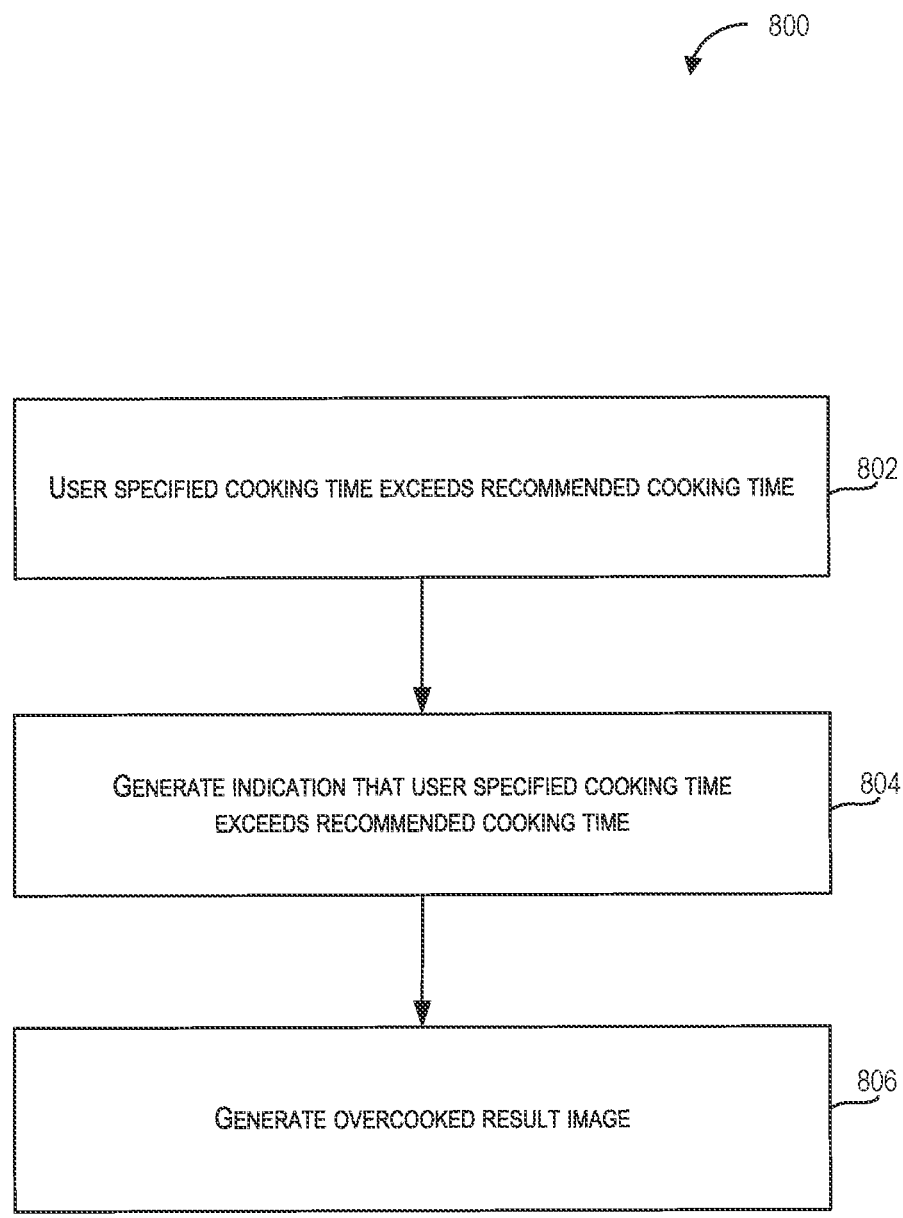
FIG. 8 provides a flow chart illustrating a method of operating a system according to exemplary embodiments of the present disclosure.

FIG. 8 depicts steps and/or operations performed in a particular order for purpose of illustration and discussion. Those of ordinary skill in the art, using the disclosures provided herein, will understand that (except as otherwise indicated) the steps of any of the methods disclosed herein can be modified, adapted, rearranged, omitted, or expanded in various ways without deviating from the scope of the present disclosure. For example, one or more parts of the method 800 can be performed as part of the method 700 that is depicted in FIG. 7. Further, any part of the method 800 can be performed by the system 100 that is depicted in FIG. 1.

The method 800 can be performed in response to a user specified cooking time exceeding a recommended cooking time by a predetermined proportion of the recommended cooking time. For example, the controller 510A can compare a user specified cooking time (e.g., a time of thirty minutes) to a recommended cooking time (e.g., twenty minutes) to determine whether the user specified cooking time exceeds the recommended cooking time by greater than ten percent (10%). If the user specified cooking time exceeds the recommended cooking time by the predetermined proportion of the recommended cooking time, the method 800 can be performed. If the user specified cooking time does not exceed the recommended cooking time by the predetermined proportion of the recommended cooking time, the method 800 will not be performed.

At 810, the method 800 can include generating an indication that the user specified cooking time exceeds the recommended cooking time. For example, the cooking appliance 300 can generate a visual indication (e.g., text indicating "THE COOKING TIME IS TOO LONG, YOUR FOOD MAY BE OVERCOOKED") on the image monitor 112. In some embodiments, the indication generated by the image monitor 112 and/or the user interface panel 334 can include an audible indication (e.g., a synthetic voice indicating "PLEASE REDUCE THE COOKING TIME"). In some embodiments, the cooking appliance 300 can provide the recommended cooking time as an alternative to the user specified cooking time.

At 820, the method 800 can include generating an overcooked result image based at least in part on providing an input comprising the user specified cooking time to the machine-learned model. For example, the machine-learned model 416 (depicted in FIG. 4) can be used to generate an overcooked result image based on input 404 that includes the image signal 406, the mass signal 408, the temperature signal 410, and the one or more settings including the user specified cooking time. The overcooked result image can include a depiction of the at least one object after the user specified cooking time. For example, the image monitor 112 can display an overcooked result image of a piece of steak that appears blackened due to the user specified cooking time exceeding the recommended cooking time by at least the predetermined portion of the recommended cooking time.

Figure 9:
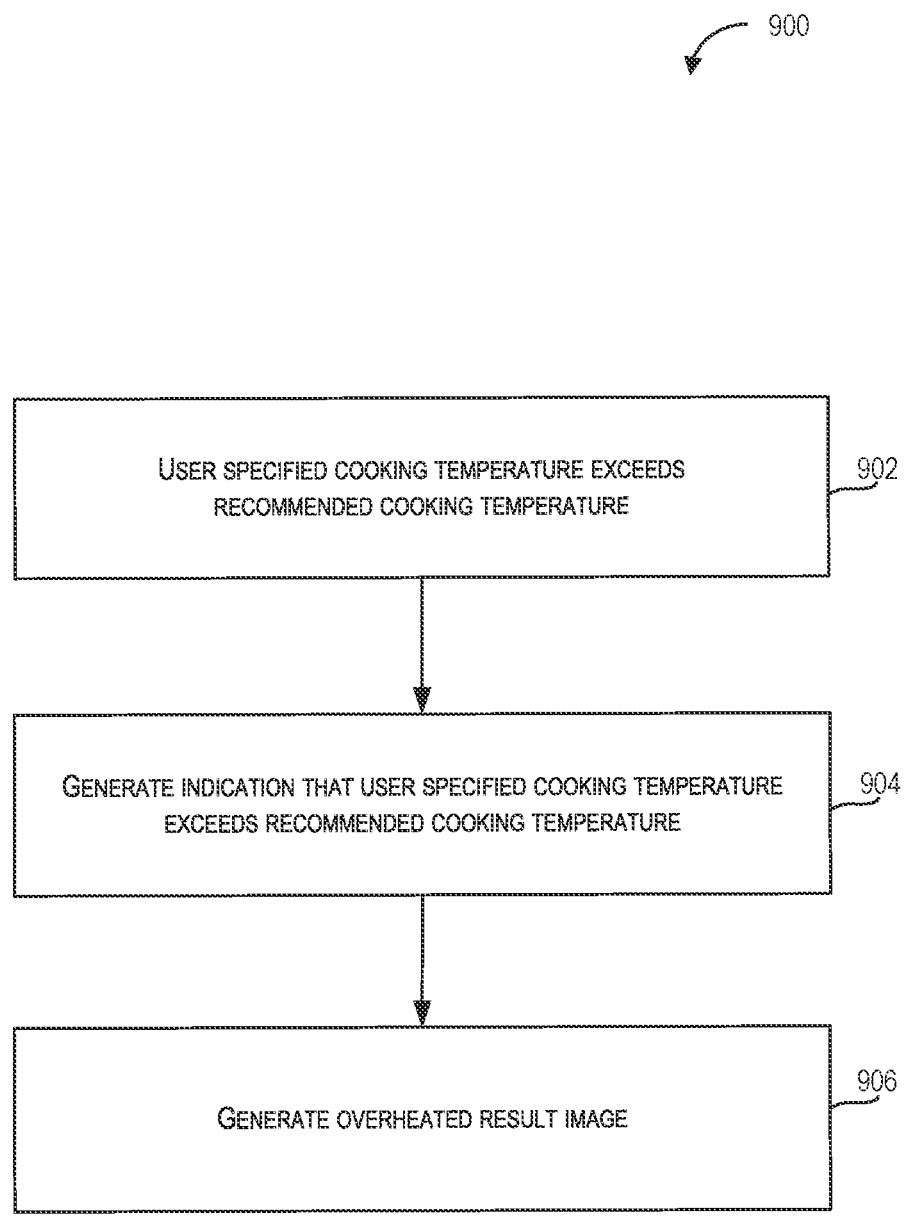
FIG. 9 provides a flow chart illustrating a method of operating a system according to exemplary embodiments of the present disclosure.

FIG. 9 depicts steps and/or operations performed in a particular order for purpose of illustration and discussion. Those of ordinary skill in the art, using the disclosures provided herein, will understand that (except as otherwise indicated) the steps of any of the methods disclosed herein can be modified, adapted, rearranged, omitted, or expanded in various ways without deviating from the scope of the present disclosure. For example, one or more parts of the method 900 can be performed as part of the method 700 that is depicted in FIG. 7. Further, any part of the method 900 can be performed by the system 100 that is depicted in FIG. 1.

The method 900 can be performed in response to a user specified cooking temperature exceeding a recommended cooking temperature by a predetermined proportion of the recommended cooking temperature. By way of example only, the predetermined portion of the recommended cooking temperature can range from ten percent (10%) of the recommended cooking temperature to eighty percent (80%) of the recommended cooking temperature. By way of further example, the controller 510A can compare a user specified cooking temperature (e.g., a temperature of one-hundred and fifty (150) degrees Celsius) to a recommended cooking temperature (e.g., a temperature of one-hundred (100) degrees Celsius twenty minutes) to determine whether the user specified cooking temperature exceeds the recommended cooking temperature by greater than twenty percent (20%). If the user specified cooking temperature exceeds the recommended cooking temperature by the predetermined proportion of the recommended cooking temperature (if the user specified temperature is greater than one-hundred and twenty (120) degrees Celsius), the method 900 can be performed. If the user specified cooking temperature does not exceed the recommended cooking temperature by the predetermined proportion of the recommended cooking temperature, the method 900 will not be performed.

At 910, the method 900 can include generating an indication that the user specified cooking temperature exceeds the recommended cooking temperature. For example, the cooking appliance 300 can generate a visual indication (e.g., text indicating "THE COOKING TEMPERATURE IS TOO HOT, YOUR FOOD MAY TURN OUT OVERHEATED") on the image monitor 112. In some embodiments, the indication generated by the image monitor 112 and/or the user interface panel 334 can include an audible indication (e.g., a pre-recorded voice indicating "PLEASE REDUCE THE COOKING TEMPERATURE"). In some embodiments, the cooking appliance 300 can provide the recommended cooking temperature as an alternative to the user specified cooking temperature.

At 920, the method 900 can include generating an overheated result image based at least in part on providing an input comprising the user specified cooking temperature to the machine-learned model. For example, the machine-learned model 416 (depicted in FIG. 4) can be used to generate an overheated result image based on input 404 that includes the image signal 406, the mass signal 408, the temperature signal 410, and the one or more settings including the user specified cooking temperature. The overheated result image can include a depiction of the at least one object as it would appear after being cooked at the user specified cooking temperature. For example, the image monitor 112 can display an overheated result image of a piece of salmon that appears dark due to the user specified cooking temperature exceeding the recommended cooking temperature by at least the predetermined proportion of the recommended cooking temperature.

Figure 10:
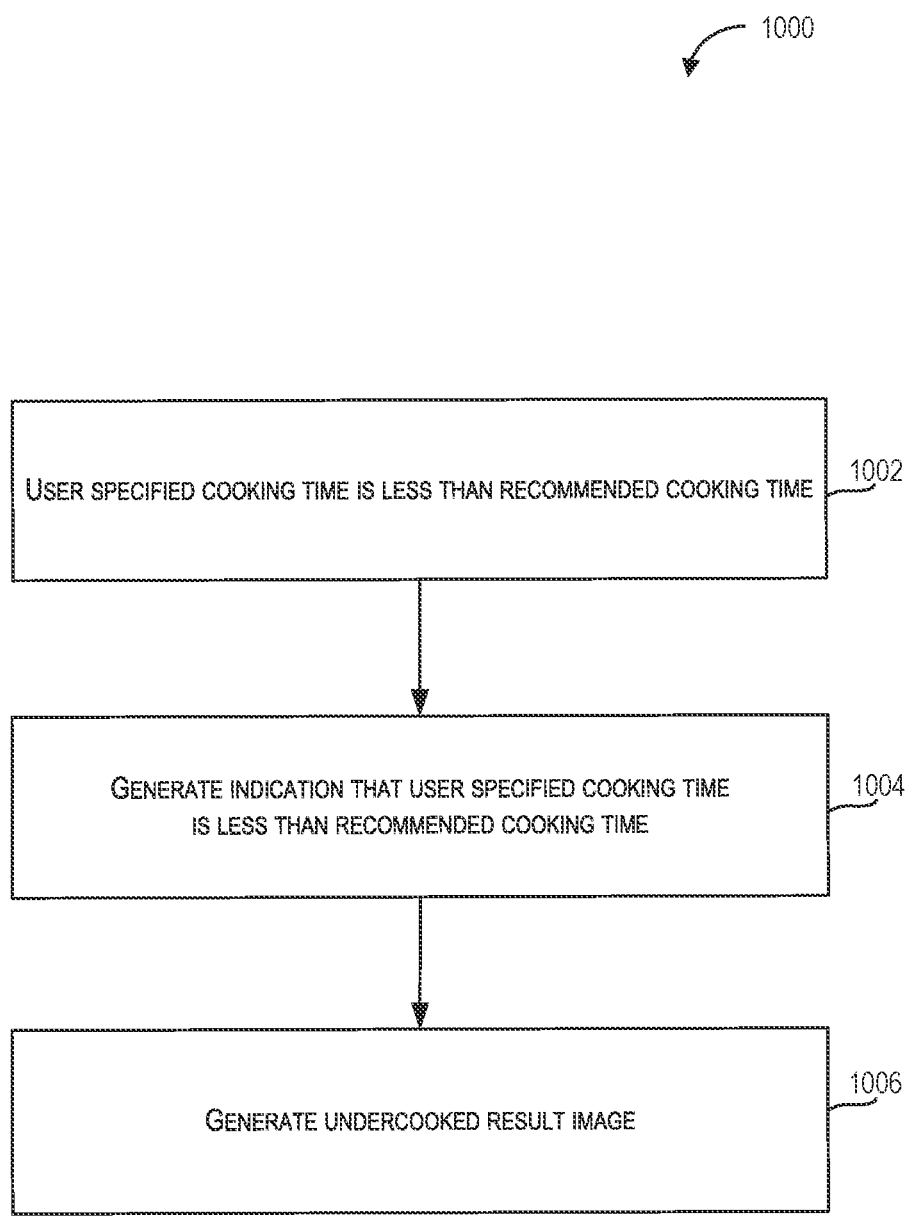
FIG. 10 provides a flow chart illustrating a method of operating a system according to exemplary embodiments of the present disclosure.

FIG. 10 depicts steps and/or operations performed in a particular order for purpose of illustration and discussion. Those of ordinary skill in the art, using the disclosures provided herein, will understand that (except as otherwise indicated) the steps of any of the methods disclosed herein can be modified, adapted, rearranged, omitted, or expanded in various ways without deviating from the scope of the present disclosure. For example, one or more parts of the method 1000 can be performed as part of the method 700 that is depicted in FIG. 7. Further, any part of the method 1000 can be performed by the system 100 that is depicted in FIG. 1.

The method 1000 can be performed in response to a user specified cooking time being less than a recommended cooking time by a predetermined proportion of the recommended cooking time. For example, the controller 510A can compare a user specified cooking time (e.g., a time of ten (10) minutes) to a recommended cooking time (e.g., twenty minutes) to determine whether the user specified cooking time is less than the recommended cooking time by greater than twenty percent (20%). If the user specified cooking time is less than the recommended cooking time by the predetermined proportion of the recommended cooking time, the method 1000 can be performed. If the user specified cooking time is not less than the recommended cooking time by the predetermined proportion of the recommended cooking time, the method 1000 will not be performed.

At 1010, the method 1000 can include generating an indication that the user specified cooking time is less than the recommended cooking time. For example, the cooking appliance 300 can generate a visual indication (e.g., text indicating "THE COOKING TIME IS NOT LONG ENOUGH, YOUR FOOD MAY BE UNDERCOOKED") on the image monitor 112. In some embodiments, the indication generated by the image monitor 112 and/or the user interface panel 334 can include an audible indication (e.g., a synthetic voice indicating "PLEASE INCREASE THE COOKING TIME"). In some embodiments, the cooking appliance 300 can provide the recommended cooking time as an alternative to the user specified cooking time.

At 1020, the method 1000 can include generating an undercooked result image based at least in part on providing an input comprising the user specified cooking time to the machine-learned model. For example, the machine-learned model 416 (depicted in FIG. 4) can be used to generate an undercooked result image based on input 404 that includes the image signal 406, the mass signal 408, the temperature signal 410, and the one or more settings including the user specified cooking time. The undercooked result image can include a depiction of the at least one object after the user specified cooking time. For example, the image monitor 112 can display an undercooked result image of a piece of steak that appears pinkish due to the user specified cooking time being less than the recommended cooking time by at least the predetermined proportion of the recommended cooking time.

Figure 11:
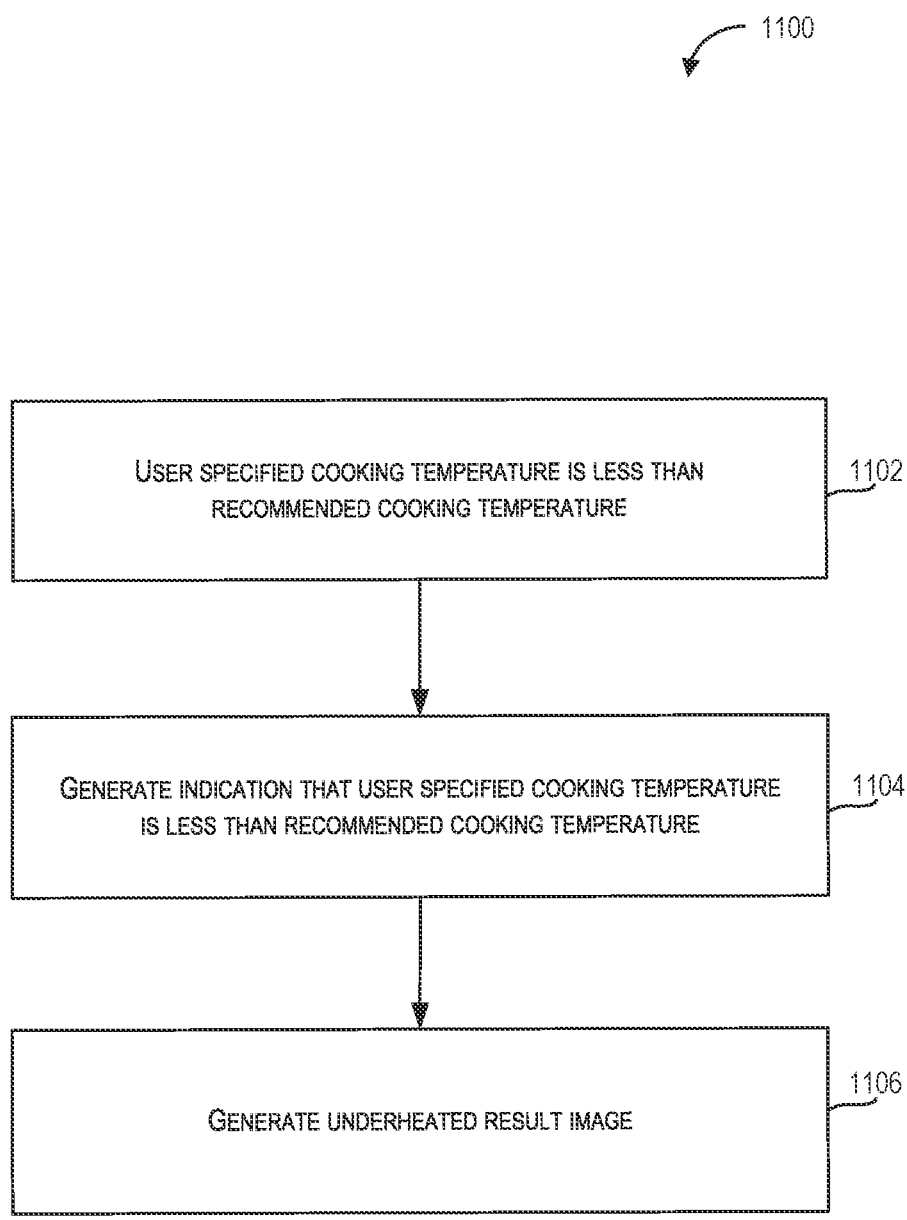
FIG. 11 provides a flow chart illustrating a method of operating a system according to exemplary embodiments of the present disclosure.

FIG. 11 depicts steps and/or operations performed in a particular order for purpose of illustration and discussion. Those of ordinary skill in the art, using the disclosures provided herein, will understand that (except as otherwise indicated) the steps of any of the methods disclosed herein can be modified, adapted, rearranged, omitted, or expanded in various ways without deviating from the scope of the present disclosure. For example, one or more parts of the method 1100 can be performed as part of the method 700 that is depicted in FIG. 7. Further, any part of the method 1100 can be performed by the system 100 that is depicted in FIG. 1.

The method 1100 can be performed in response to a user specified cooking temperature being less than a recommended cooking temperature by a predetermined proportion of the recommended cooking temperature. By way of example only, the predetermined portion of the recommended cooking temperature can range from ten percent (10%) of the recommended cooking temperature to eighty percent (80%) of the recommended cooking temperature. By way of further example, the controller 510A can compare a user specified cooking temperature (e.g., a temperature of one-hundred and twenty (120) degrees Celsius) to a recommended cooking temperature (e.g., one-hundred and fifty (150) degrees Celsius) to determine whether the user specified cooking temperature is less than the recommended cooking temperature by more than twenty percent (20%). If the user specified cooking temperature is less than the recommended cooking temperature by the predetermined proportion of the recommended cooking temperature, the method 1100 can be performed. If the user specified cooking temperature is not less than the recommended cooking temperature by the predetermined proportion of the recommended cooking temperature, the method 1100 will not be performed.

At 1110, the method 1100 can include generating an indication that the user specified cooking temperature is less than the recommended cooking temperature. For example, the cooking appliance 300 can generate a visual indication (e.g., text indicating "THE COOKING TEMPERATURE IS NOT HIGH ENOUGH, YOUR FOOD MAY TURN OUT COLD OR UNDERHEATED") on the image monitor 112. In some embodiments, the indication generated by the image monitor 112 and/or the user interface panel 334 can include an audible indication (e.g., a pre-recorded voice indicating "PLEASE INCREASE THE COOKING TEMPERATURE"). In some embodiments, the cooking appliance 300 can provide the recommended cooking temperature as an alternative to the user specified cooking temperature.

At 1120, the method 1100 can include generating an underheated result image based at least in part on providing an input comprising the user specified cooking temperature to the machine-learned model. For example, the machine-learned model 416 (depicted in FIG. 4) can be used to generate an underheated result image based on input 404 that includes the image signal 406, the mass signal 408, the temperature signal 410, and/or the one or more settings including the user specified cooking temperature. The underheated result image can include a depiction of the at least one object as it would appear after being cooked at the user specified cooking temperature. For example, the image monitor 112 can display an underheated result image of a piece of chicken that appears to have a light whitish color with a hint of pink due to the user specified cooking temperature being less than the recommended cooking temperature by at least the predetermined proportion of the recommended cooking time.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance comprising:
   a camera assembly directed at a cooktop surface;
   a mass sensor assembly configured to measure a mass of at least one object on the cooktop surface;
   a thermal sensor assembly configured to measure a temperature of the at least one object; and
   a controller in operable communication with the camera assembly, the mass sensor assembly, and the thermal sensor assembly, the controller configured to initiate one or more result inference operations comprising:
   accessing an image signal from the camera assembly, the image signal comprising an image of the at least one object;
   accessing a mass signal from the mass sensor assembly, the mass signal comprising the mass of the at least one object;
   accessing a temperature signal from the thermal sensor assembly, the temperature signal comprising the temperature of the at least one object;
   generating an inferred cooking result based at least in part on a machine-learned model that is configured to perform operations on an input comprising the image signal, the mass signal, and the temperature signal, the inferred cooking result comprising an inferred image of the at least one object as it is predicted to appear after a recommended cooking time at a recommended temperature.

2. The cooktop appliance of claim 1, further comprising:
   an image monitor in operable communication with the controller, the image monitor configured to display output comprising the inferred cooking result.

3. The cooktop appliance of claim 1, further comprising:
   a user interface assembly in operable communication with the controller, the user interface assembly configured to receive one or more user inputs associated with one or more settings for the cooktop appliance.

4. The cooktop appliance of claim 3, wherein the one or more settings comprise a user specified cooking time and a user specified cooking temperature, and wherein the input comprises the one or more settings.

5. The cooktop appliance of claim 4, wherein the machine-learned model is configured to generate the inferred cooking result based at least in part on an input comprising the one or more settings, the inferred cooking result comprising a depiction of the at least one object after being cooked for the user specified cooking time at the user specified cooking temperature.

6. The cooktop appliance of claim 4, wherein the one or more result inference operations comprise:
in response to the user specified cooking time exceeding the recommended cooking time by at least a predetermined proportion of the recommended cooking time:
generating an indication that the user specified cooking time exceeds the recommended cooking time; and
generating an overcooked result image based at least in part on providing an input comprising the user specified cooking time to the machine-learned model, the overcooked result image comprising a depiction of the at least one object after the user specified cooking time.

7. The cooktop appliance of claim 4, wherein the one or more result inference operations comprise:
in response to the user specified cooking temperature exceeding the recommended temperature by at least a predetermined proportion of the temperature:
generating an indication that the user specific cooking temperature exceeds the recommended temperature; and
generating an overheated result image based at least in part on providing an input comprising the user specified cooking temperature to the machine-learned model, the overheated result image comprising a depiction of the at least one object after being cooked at the user specified cooking temperature.

8. The cooktop appliance of claim 1, wherein the inferred cooking result comprises a plurality of inferred cooking result images associated with a corresponding plurality of inferred cooking times within a predetermined duration of the recommended cooking time.

9. The cooktop appliance of claim 1, wherein the inferred cooking result comprises a plurality of inferred cooking result images associated with a corresponding plurality of inferred temperatures within a predetermined temperature range of the recommended temperature.

10. The cooktop appliance of claim 1, wherein the machine-learned model comprises a generative adversarial network, a convolutional neural network, a recurrent neural network, or a deep belief network.

11. The cooktop appliance of claim 1, wherein the camera assembly comprises an image sensor configured to detect light in the visible spectrum.

12. The cooktop appliance of claim 1, wherein the machine-learned model is configured to determine a type of the at least one object based at least in part on the image signal, the machine-learned model configured to generate the inferred cooking result based at least in part on the type of the at least one object.

13. The cooktop appliance of claim 1, wherein the machine-learned model is configured to determine a size of the at least one object based at least in part on the image signal, the machine-learned model configured to generate the inferred cooking result based at least in part on the size of the at least one object.

14. The cooktop appliance of claim 1, wherein the thermal sensor assembly comprises an infrared sensor.

15. A method of inferring cooking results, the method comprising:
accessing, by a computing system comprising one or more processors, an image signal, the image signal comprising an image of at least one object on a cooktop surface;
accessing, by the computing system, a mass signal, the mass signal comprising a mass of the at least one object;
accessing, by the computing system, a temperature signal, the temperature signal comprising a temperature of the at least one object;
generating, by the computing system, an inferred cooking result based at least in part on a machine-learned model that is configured to perform operations on an input comprising the image signal, the mass signal, and the temperature signal, wherein the inferred cooking result comprises an inferred image of the at least one object as it is predicted to appear after a recommended cooking time at a recommended temperature.

16. The method of claim 15, further comprising:
sending, by the computing system, the inferred cooking result to a remote computing device, the remote computing device comprising a mobile computing device.

17. The method of claim 15, wherein the machine-learned model is configured based at least in part on training data comprising a plurality of training images of foodstuffs associated with a corresponding plurality of cooking times and a plurality of cooking temperatures.

18. A system for inferring cooking results, the system comprising:
one or more processors; and
one or more memory devices, the one or more memory devices storing computer-readable instructions that, when executed by the one or more processors, cause the one or more processors to perform operations, the operations comprising:
accessing an image signal, the image signal comprising an image of at least one object;
accessing a mass signal, the mass signal comprising a mass of the at least one object;
accessing a temperature signal, the temperature signal comprising a temperature of the at least one object;
generating an inferred cooking result based at least in part on a machine-learned model that is configured to perform operations on an input comprising the image signal, the mass signal, and the temperature signal, wherein the inferred cooking result comprises an inferred image of the at least one object as it is predicted to appear after a recommended cooking time at a recommended temperature.

19. The system of claim 18, wherein the input comprises one or more user cooking patterns based at least in part on one or more foodstuffs that were prepared by a user of a cooktop appliance, the machine-learned model configured to determine the inferred cooking result based at least in part on the one or more user cooking patterns.

20. The system of claim 18, wherein the image signal is received from a remote computing device, the image signal comprising a depiction of the at least one object captured by a camera of the remote computing device.

* * * * *